(12) United States Patent
Lane et al.

(10) Patent No.: US 9,862,144 B2
(45) Date of Patent: Jan. 9, 2018

(54) DETECTION, MONITORING, AND MANAGEMENT OF GAS PRESENCE, GAS FLOW AND GAS LEAKS IN COMPOSITES MANUFACTURING

(71) Applicant: Convergent Manufacturing Technologies Inc., Vancouver (CA)

(72) Inventors: Malcolm David Lane, Vancouver (CA); Anoshiravan Poursartip, Vancouver (CA); Goran Fernlund, Vancouver (CA); Anthony Michael Floyd, Vancouver (CA); David Andrew Van Ee, Vancouver (CA); Morgan Edwin John Hibbert, Vancouver (CA)

(73) Assignee: Convergent Manufacturing Technologies Inc., Vancouver (CA)

( * ) Notice: Subject to any disclaimer, the term of this patent is extended or adjusted under 35 U.S.C. 154(b) by 999 days.

(21) Appl. No.: 13/922,135

(22) Filed: Jun. 19, 2013

(65) Prior Publication Data

US 2014/0061962 A1   Mar. 6, 2014

Related U.S. Application Data

(60) Provisional application No. 61/661,467, filed on Jun. 19, 2012.

(51) Int. Cl.
*B29C 65/00* (2006.01)
*B29C 70/44* (2006.01)
(Continued)

(52) U.S. Cl.
CPC .............. *B29C 66/90* (2013.01); *B29C 70/44* (2013.01); *B29C 70/54* (2013.01); *G01M 3/04* (2013.01)

(58) Field of Classification Search
CPC ......... B29C 66/90; B29C 70/54; B29C 70/44; G01M 3/04
See application file for complete search history.

(56) References Cited

U.S. PATENT DOCUMENTS

| 3,786,675 A | 1/1974 | Delatorre et al. |
| 3,800,586 A | 4/1974 | Delatorre et al. |
| (Continued) | | |

FOREIGN PATENT DOCUMENTS

| EP | 2093043 | 8/2009 |
| EP | 2105285 | 9/2009 |

OTHER PUBLICATIONS

J.R. Bernstein and J.W. Wagner, Fiber optic sensors for use in monitoring flow front in vacuum resin transfer molding processes, Rev. Sci. Instrum. 68, 2156 (1997); DOI: 10.1063/1.1148065; Issue Date: May 1997.

(Continued)

*Primary Examiner* — Galen Hauth
(74) *Attorney, Agent, or Firm* — Antony C. Edwards

(57) ABSTRACT

Porosity causing gas-based defects are detected, located, identified, and/or characterized by the use of defect information generated from gas flow data corresponding to gas flow characteristics measured by one or more sensors on a composite part processing piece such as a mold or membrane used during a composite manufacturing process. The defect information is generated using techniques including one or more of profiling the gas flow data, fingerprinting, line leak detection, analytical triangulation.

29 Claims, 33 Drawing Sheets

(51) Int. Cl.
　　　*G01M 3/04*　　　(2006.01)
　　　*B29C 70/54*　　　(2006.01)

(56) References Cited

U.S. PATENT DOCUMENTS

| | | | |
|---|---|---|---|
| 3,818,752 A | 6/1974 | Lindeberg | |
| 3,991,604 A | 11/1976 | Hayes et al. | |
| 4,089,348 A * | 5/1978 | Yoshida | F16K 15/144 |
| | | | 137/856 |
| 4,272,985 A | 6/1981 | Rapson, Jr. et al. | |
| 4,478,077 A | 10/1984 | Bohrer et al. | |
| 4,498,497 A | 2/1985 | Rosaen | |
| 4,602,499 A | 7/1986 | Norton et al. | |
| 4,681,651 A | 7/1987 | Brozovic et al. | |
| 4,698,115 A | 10/1987 | Dodds | |
| 4,732,415 A | 3/1988 | Matin et al. | |
| 4,755,341 A | 7/1988 | Reavely et al. | |
| 4,852,916 A | 8/1989 | Johnson | |
| 4,869,770 A | 9/1989 | Christensen et al. | |
| 5,046,762 A | 9/1991 | Konishi | |
| 5,088,322 A | 2/1992 | Fitzpatrick et al. | |
| 5,105,654 A | 4/1992 | Maruyama et al. | |
| 5,106,568 A | 4/1992 | Honka | |
| 5,272,911 A | 12/1993 | Beggs et al. | |
| 5,655,357 A | 8/1997 | Kristen | |
| 5,807,593 A | 9/1998 | Thompson | |
| 5,847,264 A | 12/1998 | Martin et al. | |
| 6,532,799 B2 * | 3/2003 | Zhang | B29C 70/48 |
| | | | 264/40.1 |
| 6,741,955 B2 | 5/2004 | Rutherford et al. | |
| 6,853,925 B2 | 2/2005 | Daniel et al. | |
| 7,029,267 B2 | 4/2006 | Caron | |
| 7,093,612 B2 | 8/2006 | Greene et al. | |
| 7,305,308 B2 * | 12/2007 | Daniel | G01N 15/0826 |
| | | | 264/40.3 |
| 7,590,498 B1 | 9/2009 | Chung et al. | |
| 8,313,600 B2 * | 11/2012 | Wilson | G06F 3/0418 |
| | | | 156/169 |
| 8,708,014 B2 | 4/2014 | Schibsbye | |
| 9,505,180 B2 | 11/2016 | Schibsbye | |
| 2002/0022422 A1 | 2/2002 | Waldrop, III et al. | |
| 2004/0079148 A1 * | 4/2004 | Sandford | B01D 29/60 |
| | | | 73/168 |
| 2007/0157457 A1 | 7/2007 | Fried | |
| 2008/0148817 A1 | 6/2008 | Miller et al. | |
| 2008/0168826 A1 * | 7/2008 | Saidi | G01M 3/20 |
| | | | 73/40 |
| 2008/0202212 A1 | 8/2008 | Liepert | |
| 2008/0252470 A1 | 10/2008 | Taricco | |
| 2009/0243128 A1 * | 10/2009 | Nelson | B29C 43/3642 |
| | | | 264/40.1 |
| 2009/0273107 A1 | 11/2009 | Advani et al. | |
| 2010/0170326 A1 | 7/2010 | Miller et al. | |
| 2010/0326584 A1 * | 12/2010 | Schibsbye | B29C 70/443 |
| | | | 156/64 |
| 2011/0259086 A1 | 10/2011 | Harris et al. | |
| 2013/0284090 A1 * | 10/2013 | Balasubramanian | C23C 16/52 |
| | | | 118/712 |

OTHER PUBLICATIONS

K-T. Hsiao, R. Mathur, S. G. Advani, J.W. Gillespie Jr., B. K. Fink, A Closed Form Solution for Flow During the Vacuum Assisted Resin Transfer Molding Process, J. Manuf. Sci. Eng, Aug. 2000, vol. 122, Issue 3, 463 (13 pages), DOI: 10.1115/1.1285907.

Kuang-Ting Hsiao, Mathieu DeVillard and Suresh G. Advani, Simulation Based Flow Distribution Network Optimization for Vacuum Assisted Resin Transfer Moulding Process, 2004, Modelling Simul. Mater. Sci. Eng., 12, S175-S190; DOI: 10.1088/0965-0393/12/2/S08.

Moon Koo Kang, Woo Il Lee, Flow-Front Refinement Technique for the Numerical Simulation of the Resin-Transfer Molding Process, Composites Science and Technology, vol. 59, Issue 11, Jan. 1999, pp. 1663-1674.

M.K. Kang, W.I. Lee, H.T. Hahn, Analysis of Vacuum Bag Resin Transfer Molding Process, Composites Part A: Applied Science and Manufacturing, vol. 32, Issue 11, Nov. 2001.

Jeremy G. Opperer, Sun K. Kim and Isaac M. Daniel, Gas Flow Method for Detection of Local Preform Defects Based on Statistical Analysis, Center for Intelligent Processing of Composites, Northwestern University, Evanston IL USA.

Sun K. Kim, Jeremy G. Opperer and Isaac M. Daniel, Gas Flow Method for Detecting Local Preform Defects by Inverse Estimation of Space-Varying Permeability, Journal of Composite Materials, 2003, vol. 37, No. 15/2003, p. 1367; DOI: 10.1177/0021998303035179 http://jcm.sagepub.com/content/37/15/1367.

Bryan M. Louis, Kevin Hsiao, Goran Fernlund, Gas Permeability Measurements of Out of Autoclave Prepreg MTM45-1/CF2426A, Vancouver, Canada.

James Kay, Goran Fernlund, Processing Conditions and Voids in Out of Autoclave Prepregs, University of British Columbia,Vancouver, Canada.

J. Kay, L. Fahrang, K. Hsiao, G. Fernlund, Effect of Process Conditions on Porosity in Out-Of-Autoclave Prepreg Laminates, University of British Columbia, Vancouver, Canada.

Heider, D. et al., "Feedback Control of the Vacuum Assisted Resin Transfer Molding (VARTM) Process", Proceedings of SPIE—The International Society for Optical Engineering, vol. 3589, Mar. 1999, pp. 133 to 141.

Heider, D. et al., "Flow Rate Control During Vacuum-Assisted Resin Transfer Molding (VARTM) Processing", International SAMPE Symposium and Exhibition (Proceedings), 46th Conference, May 2001, pp. 1060 to 1071.

Anonymous, Design assistance for flow sensing applications, Design World, Nov. 3, 2008, Retrieved from the internet: URL http://www.designworldonline.com/design-assistance-for-flow-sensing-applications/.

Li, Jing, Modeling, Design and Control of Vacuum Assisted Resin Transfer Modeling (VARTM) for Thickness Variation Reduction, The Florida State University DigiNole Commons, Electronic Thesis, Treatises and Dissertations, Paper 1440, May 2006, Retrieved from the internet: URL http://diginole.lib.fisu.edu/etd/1440/.

* cited by examiner

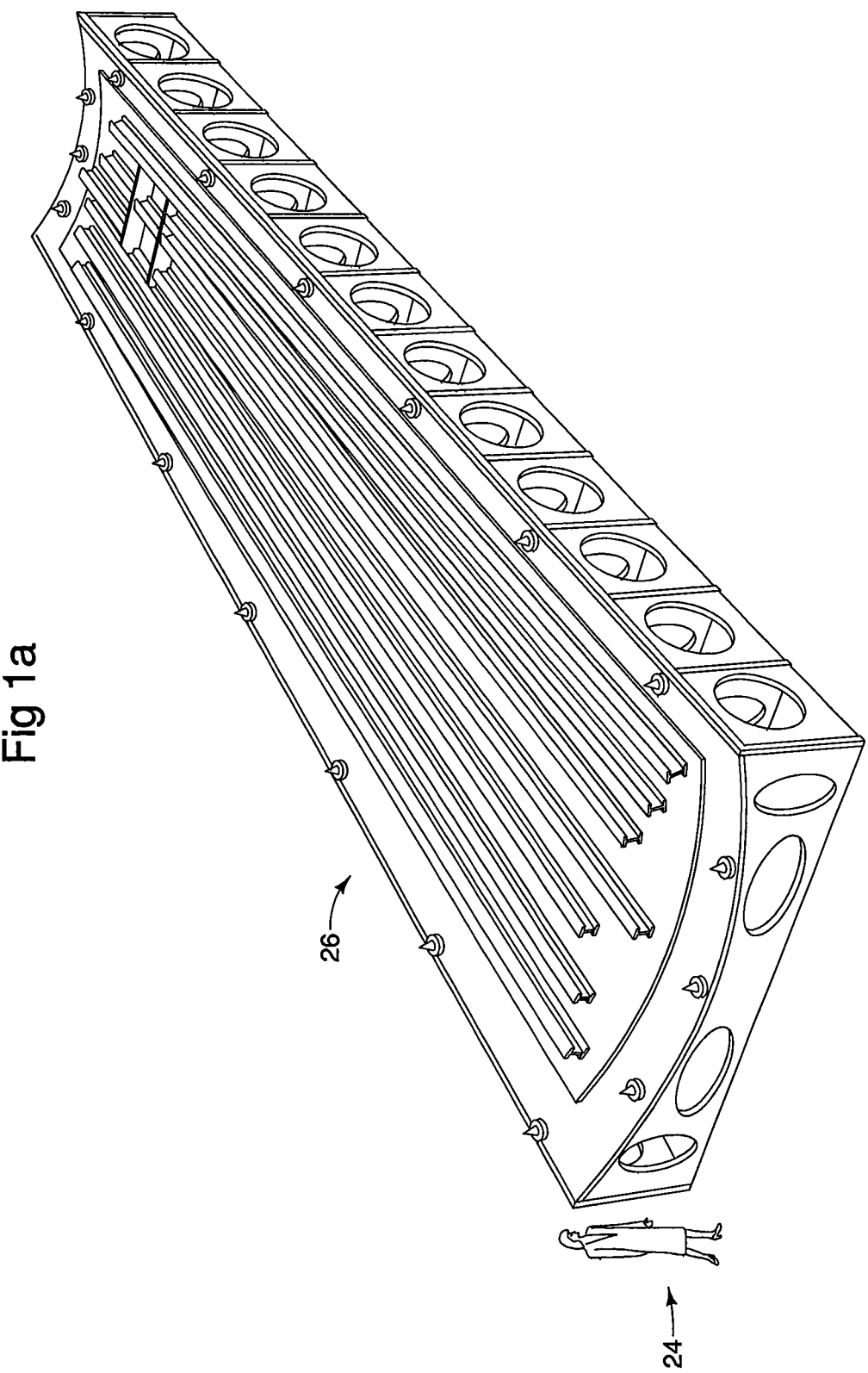

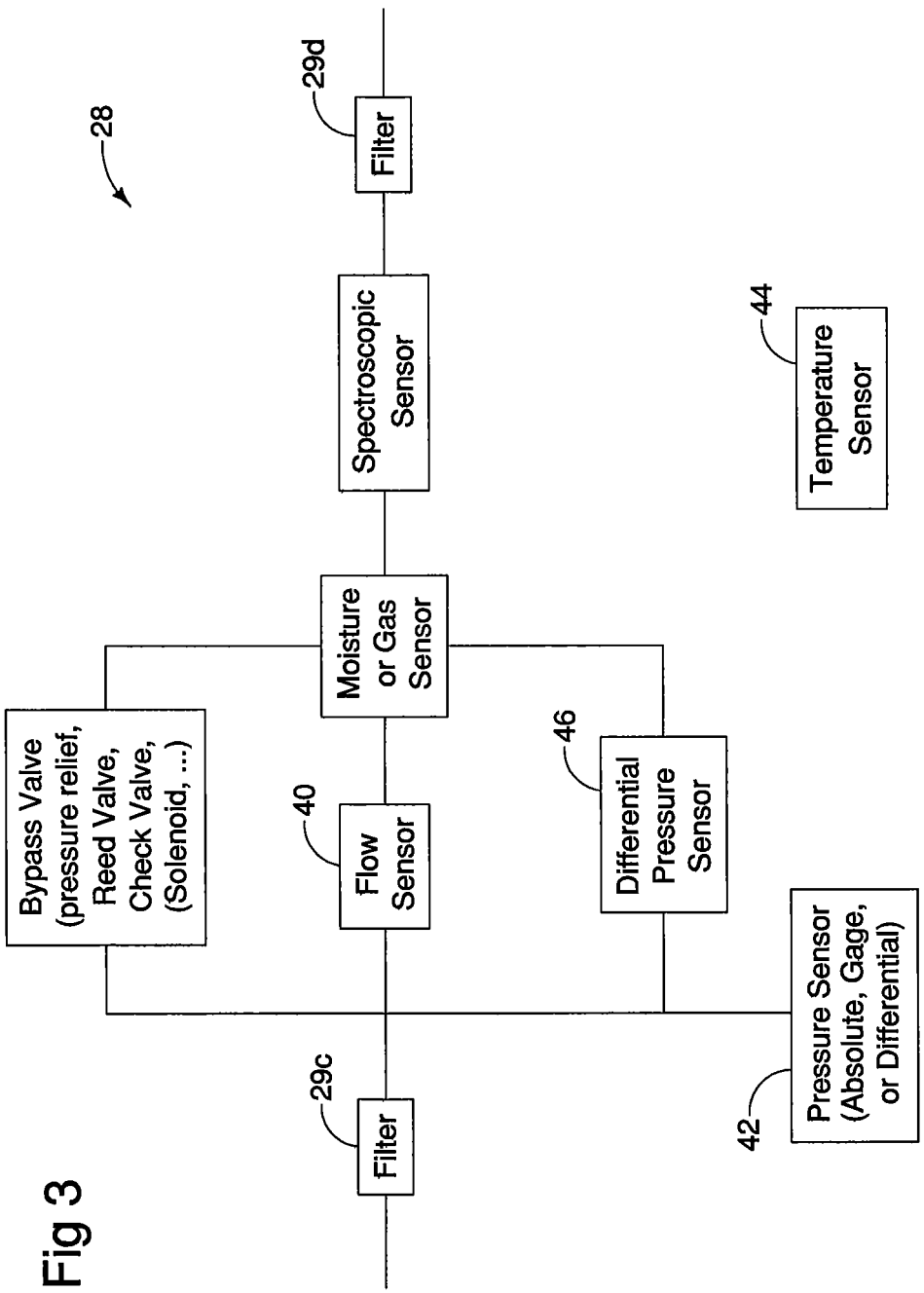

Software Flow

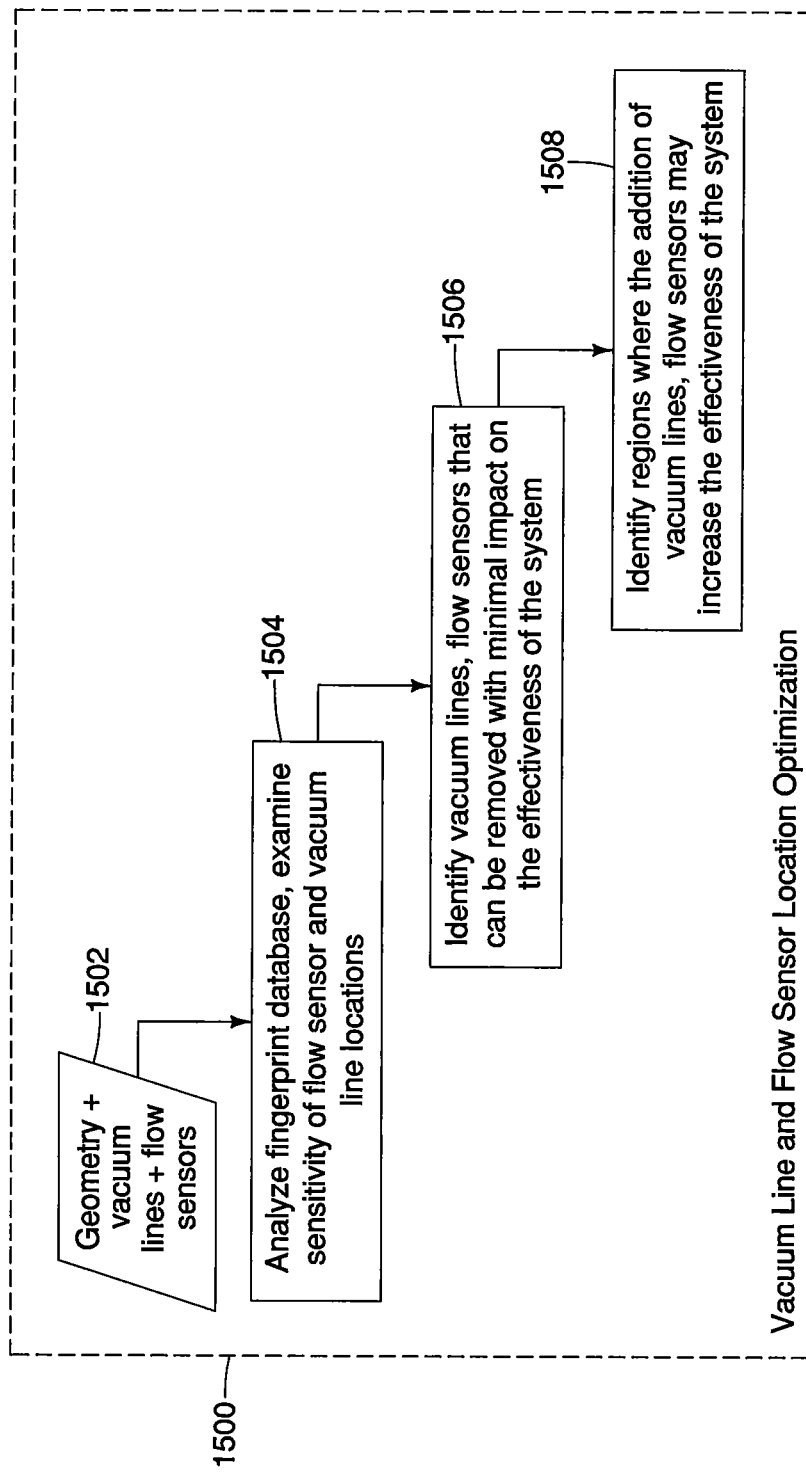

DETECTION, MONITORING, AND MANAGEMENT OF GAS PRESENCE, GAS FLOW AND GAS LEAKS IN COMPOSITES MANUFACTURING

CROSS REFERENCE TO RELATED APPLICATION

This application claims priority from U.S. Provisional Patent Application No. 61/661,467 filed Jun. 19, 2012, entitled Detection, Monitoring, and Management of Gas Presence, Gas Flow and Gas Leaks in Composites Manufacturing.

FIELD OF THE INVENTION

This disclosure generally relates to methods for collecting and interpreting industrial process data, and more specifically to a system and method using in situ sensors to collect data during composite manufacturing, including preparatory bagging and sealing, as well as the processing inside an autoclave, oven, press or other composite manufacturing system.

BACKGROUND OF THE INVENTION

In composites manufacturing, the object is to produce the highest quality part possible. A common defect in composites is the presence of voids and porosity. Voids and porosity can be minimized by minimizing the sources of gas leading to such voids and porosity, and maximizing the removal and reduction of gas volume. Sources of the gas include but are not necessarily limited to entrapped air during preparation of the part, entrapped moisture, and generation of gases as a by-product of the chemical reactions during cure of the matrix, and leaks during the manufacturing process. Regardless of the method of composites manufacturing, the removal of gas by the application of vacuum to the part is a well-established procedure. It is generally accepted that a sufficient vacuum must be pulled on a part to achieve good quality, and considerable time and effort is expended in managing and controlling the vacuum pulled on a part.

Current methods for assessing the vacuum pulled on a part in the most part involve the measurement of the gauge or absolute pressure in the vacuum lines. The lower the measured pressure, the better the vacuum pulled on the part. As it is known that the pathways into the part and within the part may be blocked, a variety of methods are used to ensure that there are open pathways to every position in the part. Methods include but are not limited to multiple vacuum lines, so-called 'breather' fabrics, and specialized raw composite material forms such as so-called 'out-of-autoclave' pre-impregnated materials.

Leaks are a particularly common source of quality problems. Sources of leaks include but are not limited to improper sealing of seams between mould segments, improper sealing of flexible vacuum bags over the part and mould, puncturing of the flexible vacuum bag, failure of rubber and other hollow inserts, and failure of the solid mould or semi-flexible caul plate. Leaks can be present from the beginning of the manufacturing process, or can occur later in the process, for example when heating or pressurizing the assembly inside an autoclave, oven, or press.

The most common methods for detecting the presence of leaks, or alternatively confirming the vacuum integrity of the system, consist of shutting off the evacuation of the assembly, and monitoring the rise of pressure as air leaks into the assembly. An increase in pressure less than a prescribed amount, over a prescribed time, is considered to be indication of adequate vacuum integrity. This procedure is time-consuming, particularly if a leak is found to be present, and the procedure must be repeated after every attempt to fix the leak. Consequently the conventional leak detection method may take many hours to locate a single leak, causing significant and costly manufacturing downtime. Furthermore, the procedure is sensitive to the size of the part, and the larger the part, the less sensitive the procedure. Other methods, including sensitive coatings on the vacuum bag, and the use of mass flow sensors for vacuum assisted resin transfer moulding, have also been evaluated. Additionally, particularly in a very large part, there is currently no simple way to identify even the approximate location of the leak, other than by compartmentalizing the part. Outside of composites manufacturing, gas flow rates out of a system are often monitored and used instead of, or with, gas pressure measurements. A fundamental problem to date has been that the relationship between gas pressure and gas flow rates is complex.

Accordingly, there is a need for a system that provides continuous usable information on the evacuation state of the assembly (including during cure), and in the case of a leak, allows for immediate and continuous monitoring of the leak, including preferably guidance as to the location of the leak and its significance.

In the prior art applicant is aware of U.S. Pat. No. 3,818,752 which issued to Lindeberg on Jun. 25, 1974 for A Method And Apparatus For Testing Tightness. Lindeberg describes the use of pressure differential across a valve for detecting leaks in an enclosed volume wherein, after the pressure difference across the valve falls below a predetermined value, any further flow that is sensed is indicative of a leak in the volume. Lindeberg also discloses that if a leak is detected, the location of the leak may be obtained by smearing the volume tank with a soap solution or the like so as to provide an indication of where air or liquid is forced out of the tank.

Applicants are also aware of United States Published Patent Application, Publication No. US2008/0252470, which published on Oct. 16, 2008 in the application of Taricco entitled Leak Detectors and Leak Detection Methods. Taricco describes that it may be necessary in the field of composite structure manufacturing to leave a pressure or vacuum on a system for a prolonged period without loss of pressure or vacuum as a leak test. A vacuum sensing and alarm system is disclosed by Taricco as being used together with a pressure gauge, separate or integral with the system, wherein the pressure gauge would confirm that the pressure or vacuum remained within acceptable limits throughout the prolonged period. An adjustable pressure of vacuum switch detects a more rapid leak. Alternatively the pressure switch may be replaced by a pressure transducer.

Applicants are also aware of United States published patent application, Publication No. US2009/0273107 which published Nov. 5, 2009 in the application of Advani et al. entitled System and Method Of Detecting Air Leakage in A VARTM Process. Advani et al. disclose using heated air and distributing the heated air along an interface along a bagging film and the surface of a mould so as to locate leaks in the bagging film by determining the temperature distribution of the air along the interface. Advani et al. describe that during the VARTM Process that checking the vacuum level is standard procedure especially when a large part is being made, as any air leakage will decrease the part quality. Advani et al. further disclose that the primary leak isolation method which is conventionally used is performed by vacuuming the air out of the mould and if the vacuum pressure level has not decreased after a predetermined amount of time that the mould is considered to be free of air leaks, but that the disadvantage of this method is that it is only able to indicate if there is or is not a leak and does not specify the location of any leak. Thus Advani et al. teach using thermal leak detection employing a heat gun to warm air and introduce that warm air to potential leak areas around the mould, and that the method may also utilize a infrared camera to capture thermal images of the tested areas.

Applicants are also aware of United States published patent application, Publication No. 2010/0326584, which published on Dec. 30, 2010 in the application of Schibsbye entitled Method and Apparatus for Detecting Leak in A VARTM Process. Schibsbye discloses that during producing a composite structure, and in particular during the evacuation process, an air flow level through at least one vacuum outlet is measured. Schibsbye describes a method for manufacturing a composite structure which includes fibre reinforced material using a vacuum assisted resin transfer moulding process wherein the fibre material is impregnated with liquid resin. Schibsbye identifies a problem in the VARTM process wherein dry spots where the fibre material is not impregnated with resin provide areas for air pockets which need to be repaired. Schibsbye also identifies that leaks in the sealing between the mould part and the vacuum bag and/or in the vacuum bag itself may lead to problems with effectively evacuating the mould cavity or effectively filling the mould cavity with resin, thereby also being a cause of dry spots. Schibsbye states that even very small holes can cause these problems, and as fibre composite structures, such as wind turbine blades may have a length of 60 meters and have a surface area of several hundred square meters, that it can be very time consuming to find the leaks thereby prolonging the overall production time of the laminate structure.

Consequently, Schibsbye proposes the use of a gas mass flow sensor connected to an inlet tube in order to measure the gas flow through the interior of the container. A pressure transducer is provided so as to monitor the vacuum level, that is, the pressure in the interior of the sealed container and consequently the vacuum level of the mould cavity or the individual mould cavity sections. If it is determined that the gas flow for a given apparatus exceeds a predetermined threshold value for a given vacuum level, then the operator knows that a leak exists in the mould cavity, and if only a single apparatus identifies such a leak then it can be concluded that the leak exists in the corresponding mould cavity section. Schibsbye teaches that by using flow sensors an operator of the VARTM process can identify leaks and the location of such leaks faster.

Finally, applicants are aware of three United States published applications having a common inventor; namely, Miller, and a common assignee; namely, the Boeing Company. Thus in United States published patent application, Publication No. US2008/0148817, published Jun. 26, 2008, in the application of Miller et al. entitled Leak Detection In Vacuum Bags, the use of a leak detection film covering the inside face of the vacuum bag is disclosed wherein the film includes a gas permeable binder carrying oxygen sensitive material that changes in physical appearance at the location of an air leak. Miller et al. discuss that flexible vacuum bags are used in manufacturing such as the fabrication of composite structures and the bonding of parts, for example, in the aerospace industry where vacuum bags may be used in vacuum bag moulding wherein a flexible bag is placed over a part pre-form and sealed along a mould flange. Air is evacuated and liquid resin is drawn into the bag which is infused into the pre-form so that any leaks in the vacuum bag may allow air to enter and form bubbles in the resin matrix resulting in an unacceptable amount of porosity in the matrix.

Thus Miller et al. propose that leaks may be detected in gas impermeable, transparent membranes used to maintain a pressure differential by the use of a gas permeable film or coating placed on or near the membrane that emits or reflects light of various wavelengths in the area of the leak or pressure gradient so as to provide rapid visual detection of air leaks in vacuum bags. The gas sensitive material changes in appearance in response to exposure to gas caused by a leak in the bag.

In United States published patent application, Publication No. US2010/0170326, published Jul. 8, 2010, in the application of Miller et al. entitled Leak Detection In Composite Tools, which is a continuation-in-part of the aforementioned application to Miller et al., Miller et al. state that, although a vacuum integrity test may provide a means to indicate the presence of a leak, the vacuum integrity test may lack the capability to allow for identifying the location of leaks on the tool, and that another draw back is that the vacuum drop check may not provide an indication as to whether the leak is in the tool, in the vacuum bag, or in the seal that seals the vacuum bag to the tool. Miller et al. propose the use of a breather layer interposed between the tool and the leak detection film for facilitating air flow therebetween.

In United States published patent application, Publication No. US2011/0259086, published Oct. 27, 2011, in the application of Miller et al. entitled Leak Detection in Vacuum Bags, a device is described for indicating the location of an air leak in a vacuum bag used to process composite parts. The device includes a layer of material on the inner face of the bag that changes in appearance due to an oxidation-reduction reaction in the areas of the layer exposed to oxygen caused by a leak in the bag. Miller et al. describe the use of an ink or dye which is applied to the inner face of the vacuum bag film, wherein once a vacuum is drawn within the bag causing the air pressure within the bag to drop which then allows the atmospheric pressure to push the bag down onto the layup and to compact the layup, the colorimetric material is activated by directing ultraviolet light through the transparent vacuum bag and onto the ink rendering the ink reactive to oxygen so that the ink changes in color when exposed to oxygen due to a leak.

SUMMARY OF THE INVENTION

In the present invention, one or more in-situ thermal mass flow sensors are provided. Each may be packaged with one or more other sensors into a 'sensor package', to monitor gas flow in composite manufacturing processes, including but not limited to autoclave and oven manufacturing of pre-impregnated material structures made of both thermoset and thermoplastic materials; and resin infusion or resin transfer moulding processes. For example, multiple sensor packages may be used to sense flow rates at multiple locations, such as within the breather, vacuum ports, vacuum hoses, and bladder vents. In one embodiment the invention reduces the ambiguity and cost of leak check data based on pressure rise measurements or other methods, allow for identification of the location of the leak, and speeds up the process of leak detection and repair. Additionally, the flow rate profiles, including the shape of the evacuation profile, and the integral of the flow rate, i.e., the total volume of gas evacuated, may be used to evaluate the consistency of the part manufactured relative to the general population of parts manufacture, allowing for the use of statistical and data mining techniques to assess production. Additional capabilities in terms of identification of moisture outgassing and other features are further summarized and described below.

In summary, the present invention may be characterized, in one aspect, as a process for manufacturing a composite part, wherein during the process the part is engaged by a gas impermeable part-processing piece chosen from at least one of the group comprising: an upper or lower mould or tool, wherein the terms mould or tool or tooling are used interchangeably herein, a rigid or semi-rigid caul plate, a membrane, a vacuum bag, a bladder, and wherein the part processing piece has opposite inner and outer surfaces.

In the process, when the membrane is either a vacuum bag or a bladder: (i) the vacuum bag defines a flexible non-compartmentalized single volume containing or covering the part and the process is a vacuum process which includes evacuating the volume to low pressure; or, (ii) the bladder defines a flexible non-compartmentalized single volume contained in or covered by the part and the process is a pressurization process which includes pressurizing the volume.

The process includes identifying a porosity-causing gas-based defect, wherein the gas based defect includes one or more defects from the group comprising:
 a) previously entrapped gas entrapped in the part or in the volume, for example between the part and the mould or membrane or other part-processing piece,
 b) gas generated during a process cycle of the manufacturing of the part due to moisture off-gassing or volatile evolution due to the chemical changes in the part during a curing of the part,
 c) at least one gas leak.

The process may include the steps of:
 a) providing the part-processing piece and at least one gas conduit, said at least one gas conduit cooperating in fluid communication with said part-processing piece for flow of gas through said part-processing piece,
 b) mounting the part-processing piece so as to engage the part so that, respectively, the part is within a volume defined by the part-processing piece when it is around or over the part, or so that the part contains within or under it, so as to be pressurized by, the part-processing piece when it is contained in or covered by the part,
 c) providing at least one sensor mounted in cooperation with the part-processing piece, and wherein, when the at least one sensor is a plurality of sensors, the sensors are mounted in spaced apart array relative to the part when in, under or containing the part-processing piece, and wherein the sensors are in fluid communication with the volume and wherein the at least one sensor is, or the plurality of sensors are, adapted to detect and measure at least one characteristic of a gas flow as a result of the gas-based defect,
  and in a preferred embodiment the process includes the following steps:
 d) during the vacuum process or the pressurization process, respectively evacuating the volume or pressurizing the volume,
 e) detecting and measuring the at least one characteristic of the gas flow during and after the evacuating or pressurizing of the volume, wherein the at least one characteristic of the gas flow includes one or more characteristics from the group comprising: mass flow rate, temperature, pressure, moisture content, and may include a chemical content of at least one selectively detectable chemical, a spectrographically detectable content,
 f) generating gas flow data corresponding to the detecting and measuring of the at least one characteristic of the gas flow,
 g) computing defect information from the gas flow data by computing the defect information according to at least one computation technique chosen from the group comprising computing: a profile over time of the gas flow data, gas flow rate profile, gas evacuation profile, gas pressurization profile, gas flow volume, fingerprinting, analytical triangulation, gas flow rate vs. pressure, flow rate vs. temperature, moisture vs. temperature, flow rate vs. rate of pressure change.

The process may include relaying feedback of the defect information.

The feedback may, at least in part, be based on a spatial relationship between a user receiving said feedback and said mould or membrane.

The defect information may include predicted leak locations and may include a predicted leak type.

The fingerprinting may include recording the gas flow data and creating and maintaining a historical record of the gas flow data. The fingerprinting may include leak locations correlated to a physical specification of the part for each unique part.

The fingerprinting may also include computational fingerprinting, which may include creating a grid of virtual gas leak locations employing a geometry of the part and locations of the sensors relative to the part, and for each location calculating at least the gas flow rate profile for a predetermined flow rate of the gas leak to provide predicted defect information and comparing to the historical records and determining a closest match and thereby a corresponding predicted gas leak location.

The fingerprinting may also include test-based fingerprinting, which may include creating a grid of representative gas leak locations employing a geometry of the part and locations of the sensors relative to the part, and for each gas leak location creating a resealable and measurable gas leak and recording corresponding gas flow data for each location to provide the historical record of the defect information for the part, and comparing the gas flow data and the defect information of the detected and measured at least one characteristic of the gas flow to the historical record for the part to determine a closest match and thereby a corresponding predicted gas leak location or corresponding predicted gas leak locations.

The fingerprinting may include recording the gas flow rate profile as part of the historical record for each unique part. Where the process is a vacuum process, the fingerprinting may include recording the gas evacuation profile as part of the historical record for each unique part.

The line leak prediction may include providing the plurality of sensors in substantially a linear array in correspondingly substantially linearly aligned locations, fitting a curve to the gas flow data and the locations of the plurality of sensors, determining peaks in the curve and correlating the peaks to predicted locations of the at least one gas leak.

The analytical triangulation may include determining combinations of pairs of sensors by employing a geometry of the part and locations of the sensors relative to the part, and for each pair of sensors determining corresponding triangle apexes for all triangles from each pair of sensors. For each pair of sensors, a base leg of the triangle extends to and between the pair of sensors, and a remaining two legs of the triangle define an apex therebetween at the intersection thereof. The remaining two legs have first and second lengths respectively in proportion to corresponding first and second gas flow rates at the pair of sensors respectively so as to determine for each pair of sensors a corresponding set of the triangle apexes to thereby provide a corresponding apex set for the pair of sensors. For each apex set determining either: (a) a point of intersection between the apex sets; or, (b) where there is no point of intersection, a mid-point of a line joining points closest to one another between all of the apexes to provide possible leak locations. The average of the possible leak locations may be computed to thereby predict a single leak location.

The relaying of feedback may include displaying the defect information to a user while the user is inspecting the part and the mould or membrane. The defect information may thus usefully include a predicted location computed for the at least one gas leak.

The at least one sensor is advantageously mounted in fluid communication with the at least one gas conduit. The at least one sensor may include at least one sensor from the group comprising: mass flow sensors, radial flow direction sensors, pressure sensors, differential pressure sensors, temperature sensors, humidity or moisture sensors. From that group, the at least one sensor may include at least all of the following sensors: mass flow sensors, pressure sensors and differential pressure sensors. A sensor package may be provided wherein the sensor package includes at least two of the sensors from the groups within the package, and may include all of the following sensors: mass flow sensors, pressure sensors and differential pressure sensors.

At least one of the sensors may be mounted between the part and the inner surface of the mould or membrane. Breather material may be provided between the part and the inner surface of the mould or membrane, wherein the breather material has substantially uniform permeability. At least one sensor may be mounted on or in at least one of the group comprising: at least one gas conduit, gas ports, a gas breather, a mat having sensor flow passages.

A flow bypass may be provided cooperating with the sensors to reduce a pressure drop across at least one of the sensors. The bypass may include a resilient flexible bypass valve member. The bypass valve member may include a reed means, which may be biased between open and closed positions, according to a pre-determined pressure threshold, by a gas pressure of the gas flow. The pressure threshold may be a differential pressure threshold of a differential pressure across an associated sensor. The bypass may be maintained in its closed position by a magnetic field.

The step of providing at least one gas conduit may include providing a plurality of gas conduits spaced apart and mounted on, in fluid communication through, the mould or membrane, and optimizing the sensors on the gas conduits for use with each type of uniquely shaped part. The optimizing may include applying the evacuation or pressurization of the volume respectively during the vacuum or pressurization process via the gas conduits, and detecting and measuring the characteristics of the gas flow in the gas conduits, and subsequently correspondingly determining the defect information, when at least a first of the gas conduits are biased into an open-to-gas flow condition and at least a second of the gas conduits are biased into a closed-to-gas flow condition. The biasing of the at least first and at least second of the conduits into the open-to-gas flow and the closed-to-gas flow conditions respectively may be cycled through all of the gas conduits in a pattern of opening and closing of the gas conduits to the gas flow in substantially all permutations as between substantially all combinations of opening and closing of the gas conduits. The pattern may be predetermined. Further, the gas conduits may be located on the mould or membrane according to sensitivity information derived from the defect information, whereby a required number of the sensors is minimized, and sensitivity to the gas-based defects is maximized.

In one embodiment the moulds or tooling may include a manifold, wherein either the moulds or tooling or the manifold are "smart" as defined herein.

In one embodiment the flow bypass is mounted in fluid communication with at least one conduit, so as to be separate from, that is, not in fluid communication with a sensor.

Advantageously, in the bypass the reed means may include a curved reed, that is wherein said curved reed is curved so as to elastically pre-load the reed when in the closed position.

In one embodiment the gas flow sensors are adapted to measure the flow of gas both into and out of the mould or membrane.

Each gas conduit may include a corresponding inlet and/or outlet filter.

In the leak detection method, in one embodiment the gas is other than air so as to perturb the gas flow data. For example the gas may be $CO_2$ or dry $N_2$. In the latter, the sensor(s) would include a moisture sensor.

In a further embodiment, a second vacuum system is provided which is independent of the gas conduits used for the primary vacuum process. The second vacuum system is mounted in a second, independent, fluid communication with said membrane. The second vacuum system is used to locally reduce or increase, that is, to change the pressure in said membrane so as to change the flow rate of the flow of gas through the gas conduits for the primary vacuum process and thus so as to change the flow rate of the flow of gas interacting with the sensor.

In a further embodiment each gas conduit or gas port has a corresponding unique identifier so as to correlate the gas flow data with said corresponding unique identifier. The unique identifier may identify a unique location and may be chosen from the group which includes, for example, bar-code, or radio-frequency identification.

In a further embodiment at least one gas conduit may be adapted to carry power and/or data.

BRIEF DESCRIPTION OF THE DRAWINGS

In the accompanying Figures like reference numerals denote corresponding parts in each view, and wherein:

FIG. 1a is, in perspective view, an aircraft wing being manufactured by the composite manufacturing process.

FIG. 3 is a block diagram of one embodiment of a sensor package.

FIG. 29 is a schematic of vacuum line and flow sensor location optimization.

DETAILED DESCRIPTION OF EMBODIMENTS OF THE INVENTION

Figure 1:
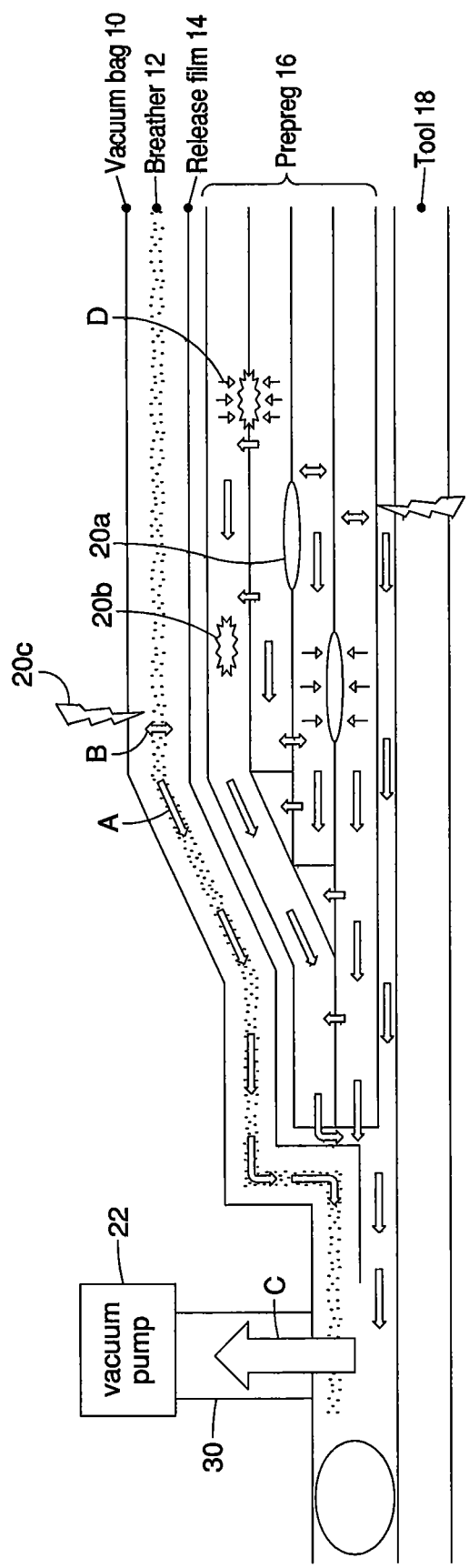
FIG. 1 is a schematic representation of void generation and dissipation.

A schematic representation of void generation and dissipation is shown in FIG. 1. A vacuum bag or member 10 overlays a breather layer 12, which overlaps a release film 14. Release film 14 overlaps layers of pre-preg 16 which have been laid-up on tool or mould 18. As used herein, the term pre-preg refers to pre-impregnated composite fibres where a pre-cured or partially cured matrix bonding material, such as epoxy, is already present. These usually take the form of a weave or are uni-directional. Gas filled voids may be formed within pre-preg 16, caused by for example entrapped air 20a, volatiles or off-gasing 20b, or leaks 20c in bag 10, tool or mould 18, etc. Gas transport may be co-planar within or interleaved between the various layers as shown by arrows A, or may be orthogonal to the layers as shown by arrows B. Collectively the gas migrates to the vacuum source, indicated in FIG. 1 by arrow C leading to vacuum pump 22. Arrows D indicate void shrinkage or collapse.

FIG. 1a illustrates a worker 24 standing by a larger part 26; illustrated by way of example to be an aircraft wing, which is being formed by the composites manufacturing methods to which this specification is directed. Thus it will be understood that the parts 26 being formed may be very large and consequently have very large surface areas.

Figure 2A:
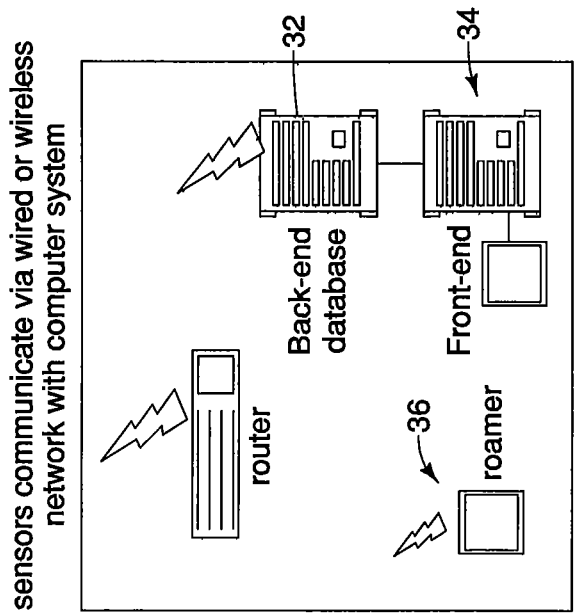
FIG. 2a is a diagrammatic representation of a computer system used in conjunction with the system of FIG. 2.
Figure 2:
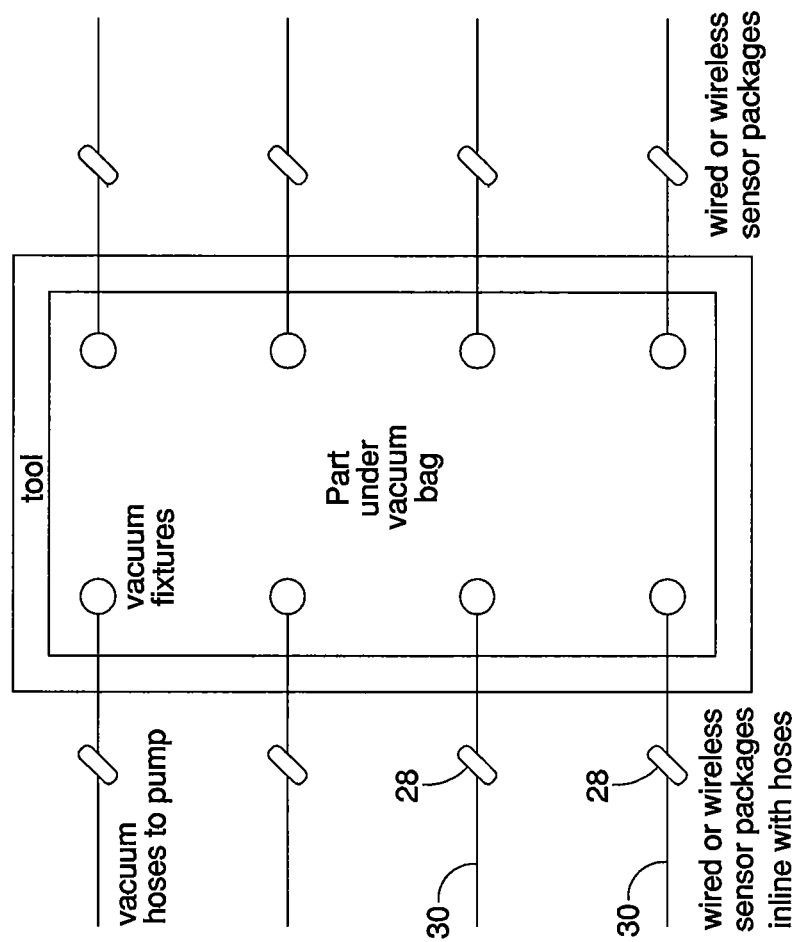
FIG. 2 is a schematic representation of a basic embodiment of a gas response measurement system.

A diagrammatic layout of a basic embodiment of the hardware system according to aspects of the present invention is shown in FIG. 2. Each sensor package 28 is connected to a vacuum line or hose 30, for example is mounted in-line with a line or hose 30. Sensor package 28 may have a variety of individual sensors inside; for example: mass flow sensors, absolute pressure sensors, differential pressure sensors, temperature sensors, moisture sensors, valve position sensors, chemical sensors, or spectroscopic sensors such as fourier transform infrared spectroscopic sensors or near-infrared spectroscopic sensors. Vacuum hoses 30 are connected to vacuum pumps 22.

Figure 1B:
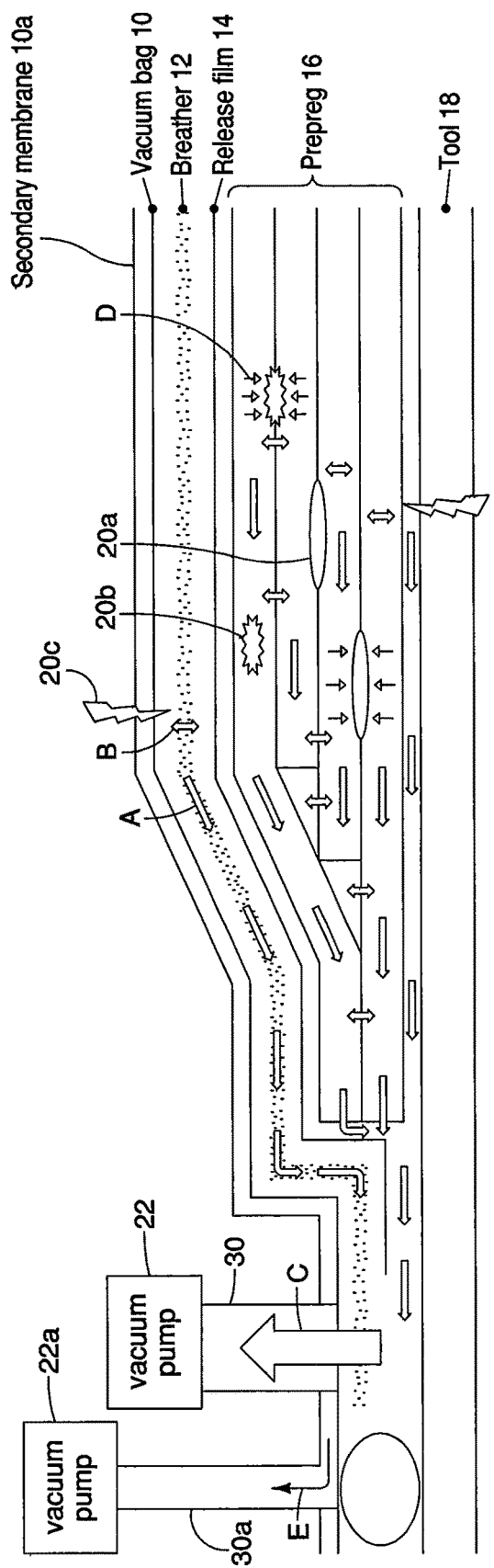
FIG. 1b is the schematic of FIG. 1 showing the use of a secondary vacuum system.

As seen in FIG. 1b, in a further embodiment, a second vacuum system is provided which is independent of the gas conduits used for the primary vacuum process. The second vacuum system is mounted in a second, independent, fluid communication with the membrane 10a. The second vacuum system is used to locally reduce or increase, that is, to change the pressure in said membrane 10a so as to change the flow rate of the flow of gas through the gas conduits 30 for the primary vacuum process and thus so as to change the flow rate of the flow of gas interacting with the sensor. Thus, secondary membrane 10a is mounted locally over vacuum bag 10 and independently evacuated via secondary hose 30a by secondary vacuum pump 22a. Gas such as air between membrane 10 and 10a flows in direction E in the case where the pressure between membrane 10 and 10a is reduced to affect the rate of flow in direction C through hose 30.

Figure 3A:
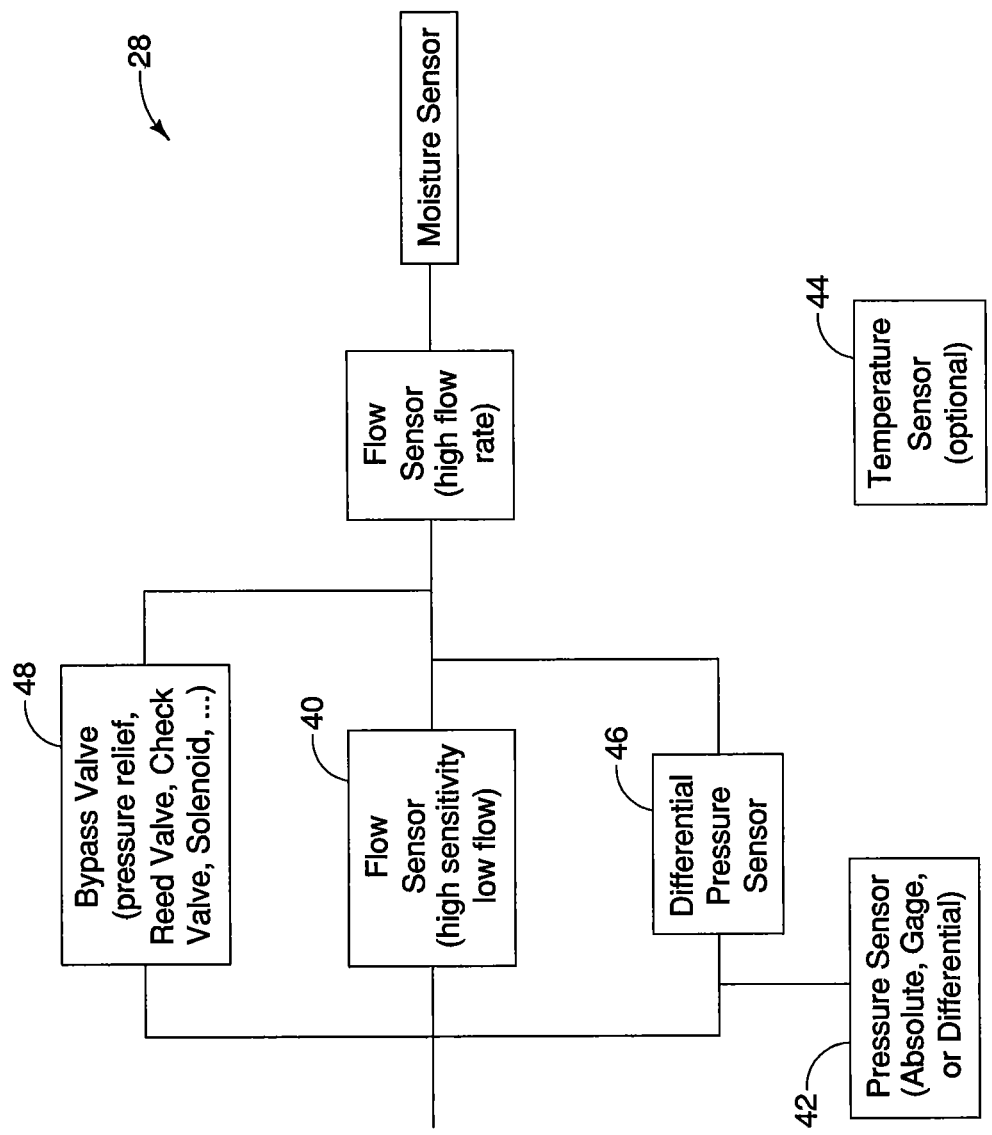
FIG. 3a is a block diagram of another embodiment of a sensor package.

As seen in FIG. 2a, each sensor package 28 communicates, via wired or wireless transmission, singly or as a group, with a back-end database 32 that stores all the information from the sensors. Two examples of sensor packages 28 are shown in FIGS. 3 and 3a. Back-end database 32 is seen in FIG. 2a interrogated by one or more front-end applications for real-time information during the manufacturing process as well as for historical and data mining information, as hereinafter described, after a given part 26 is made. The front-end application can run on the same computer as the back end application and/or a front end computer 34 or multiple other computers. The front end application and the back end application may be separate applications, a single combined application, or a mixture thereof. In one embodiment, a roamer mobile computer 36 or other portable data processing device may be carried by one or more workers so that the worker(s) receive feedback or provide input to or to control the system as they work their way around a part 26 looking for leaks. Such a device may be a wireless device including but not limited to a cell phone, tablet, mobile computer, etc. to display data such as values, plots, diagrams, images sent by the system, to provide input to the system, and to control the behaviour of the system start/stop of data collection, to change system operating parameters, etc. The amount of interactivity between the system and the wireless device varies with the capability of both the device and the system.

Although the illustration in FIG. 2 shows the schematics with sensor packages 28 only on the vacuum hoses 30 and/or ports, sensor packages 28 may also be mounted in the breather 12, such as by means of a breather mat that has multiple passages, wherein flow sensors may be mounted in the passages. The mat is placed between the part and vacuum ports providing under-bag flow sensing. Alternatively, sensor package(s) 28 may be part of the tool or mould (so-called "smart" tooling), so that manifold style vacuum lines may be set up, or may be part of a "smart" manifold such as seen by way of example in FIG. 4. Smart tooling allows the moulds or tooling 18 to have multiple vacuum port locations while vacuum is pulled from one location. Furthermore, in parts with internal cavities or volumes such as bladders, the sensors packages may measure gas transport into these cavities.

Figure 4:
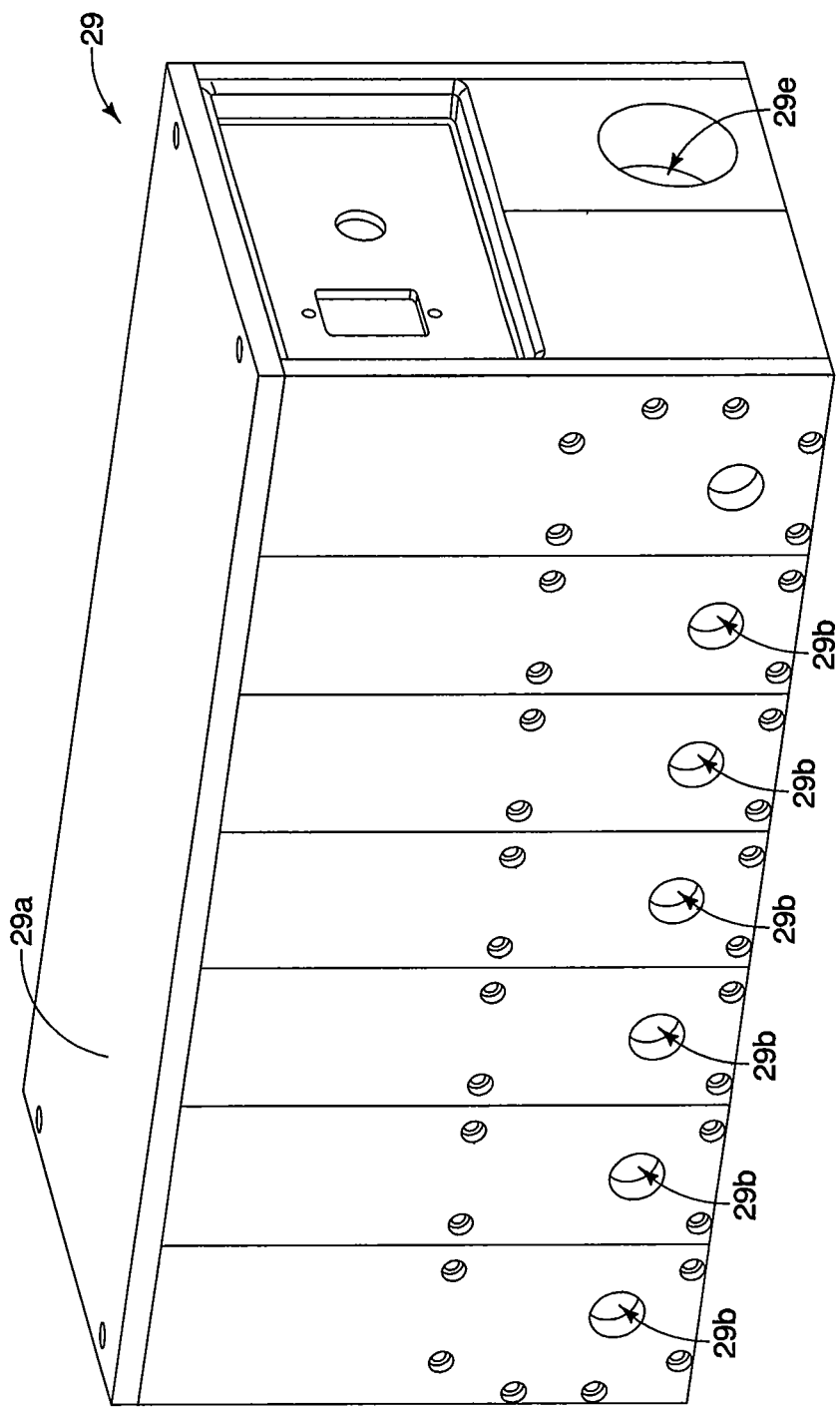
FIG. 4 is, in perspective view, one embodiment of a smart manifold.

As seen in FIG. 4, smart manifold 29 includes a housing 29a which may be compartmentalized pr modular for having sensor packages 18 associated with each flow inlet 29b. Hose 30 connect to inlets 29b. The sensor packages 28 may include inlet filters 29c and outlet filters 29d (seen in FIG. 3), sensors such as described herein below, including for example flow sensors, pressure sensors, etc., and may also advantageously include bypass valves as described below, data acquisition modules, communication modules and a battery or batteries to provide power to the modules. Flow from inlets 29c exits from one or more flow outlets 29e.

The location of one or more leaks may be identified by triangulating measured flow rates from different vacuum lines 30. This works very well for many geometries but in very complex shapes this is more difficult, and therefore the simple triangulation may be augmented by fingerprinting and learning methods, discussed below, where the system is trained for a particular part, including the bagging and other relevant details. As described below, this learning may be empirical (by introducing known leaks), analytical (by doing computer simulations) or a combination.

To provide additional leak localization capability, the positioning of the vacuum lines 30 may be optimized for this purpose, by placing strategically placed vacuum lines 30 with sensor packages 28 to identify leak locations more accurately. Given that often the leak problem is due to hoses and fittings, multiple sensor packages 28 may also be placed along a vacuum path, from part 26 to vacuum pump 22. In a system with multiple vacuum lines 30 equipped with sensor packages 28, vacuum lines 30 may be switched on or off individually or in groups, and the sensor data analyzed for patterns assisting in characterizing or localizing leaks.

Figure 5:
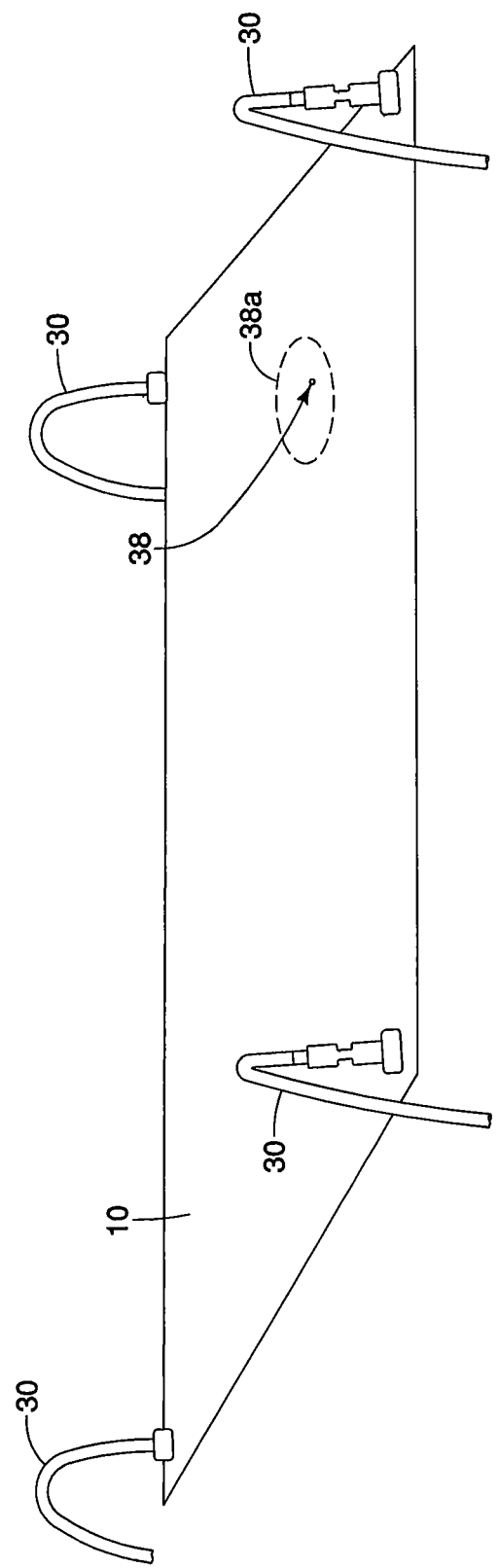
FIG. 5 illustrates the creation of a small pin hole leak on a simulated bag on a test bed.
Figure 6:
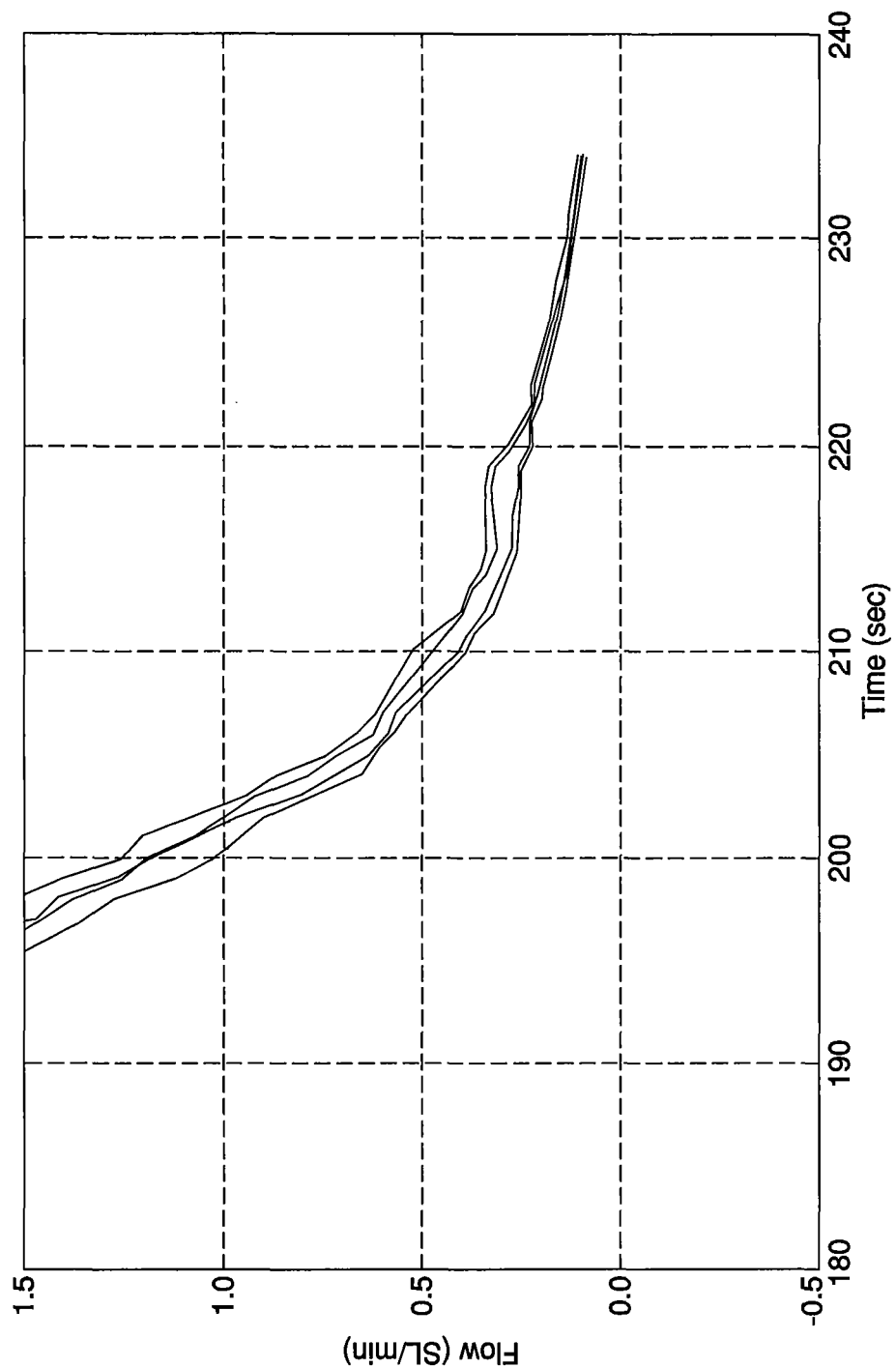
FIG. 6 illustrates the immediate response from flow sensors (with bypass) during the evacuation of the test arrangement of FIG. 5.
Figure 7:
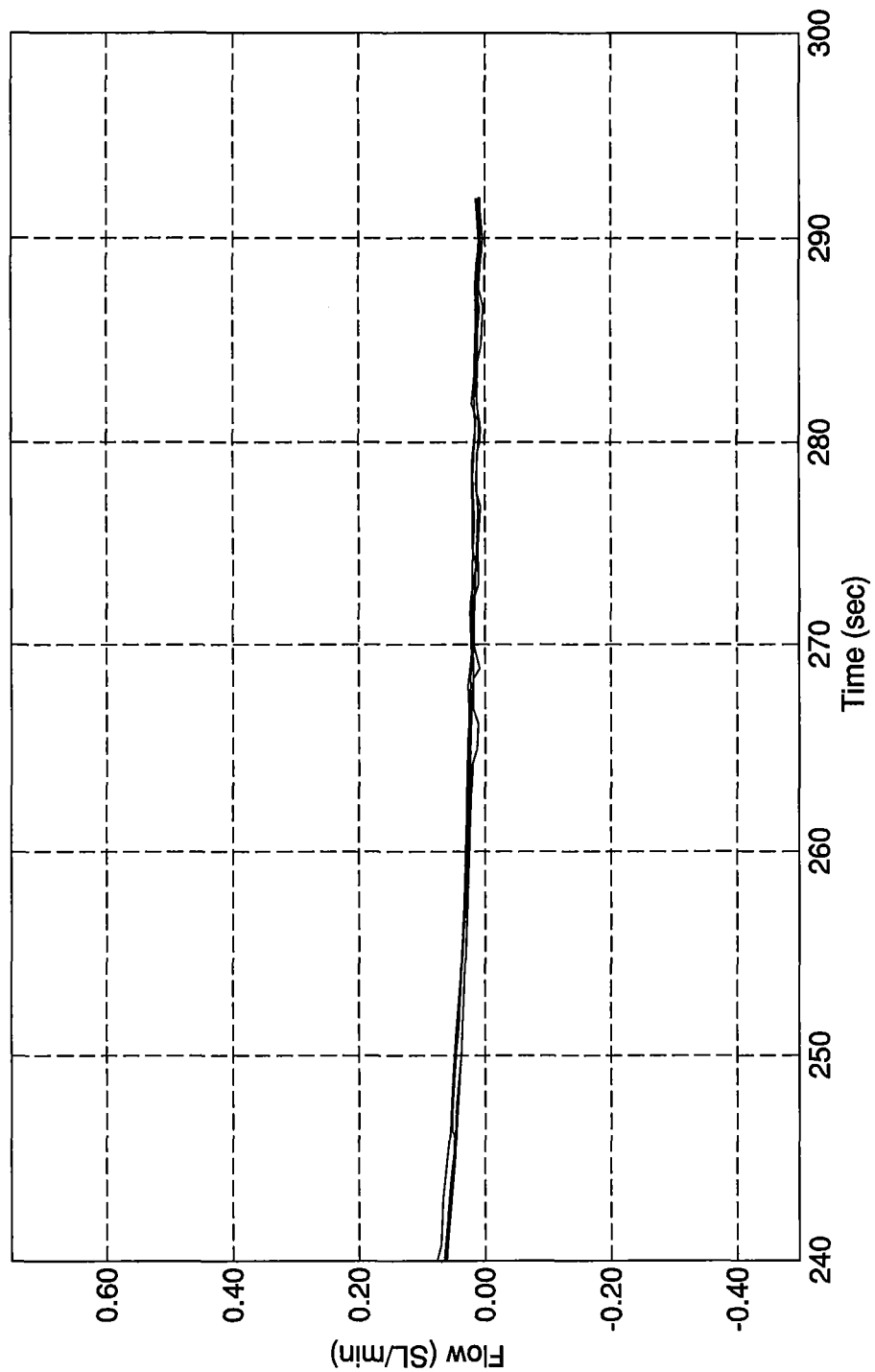
FIG. 7 illustrates the indication from the flow sensors that the simulated bag of FIG. 5 is fully evacuated and no leaks are present.
Figure 8:
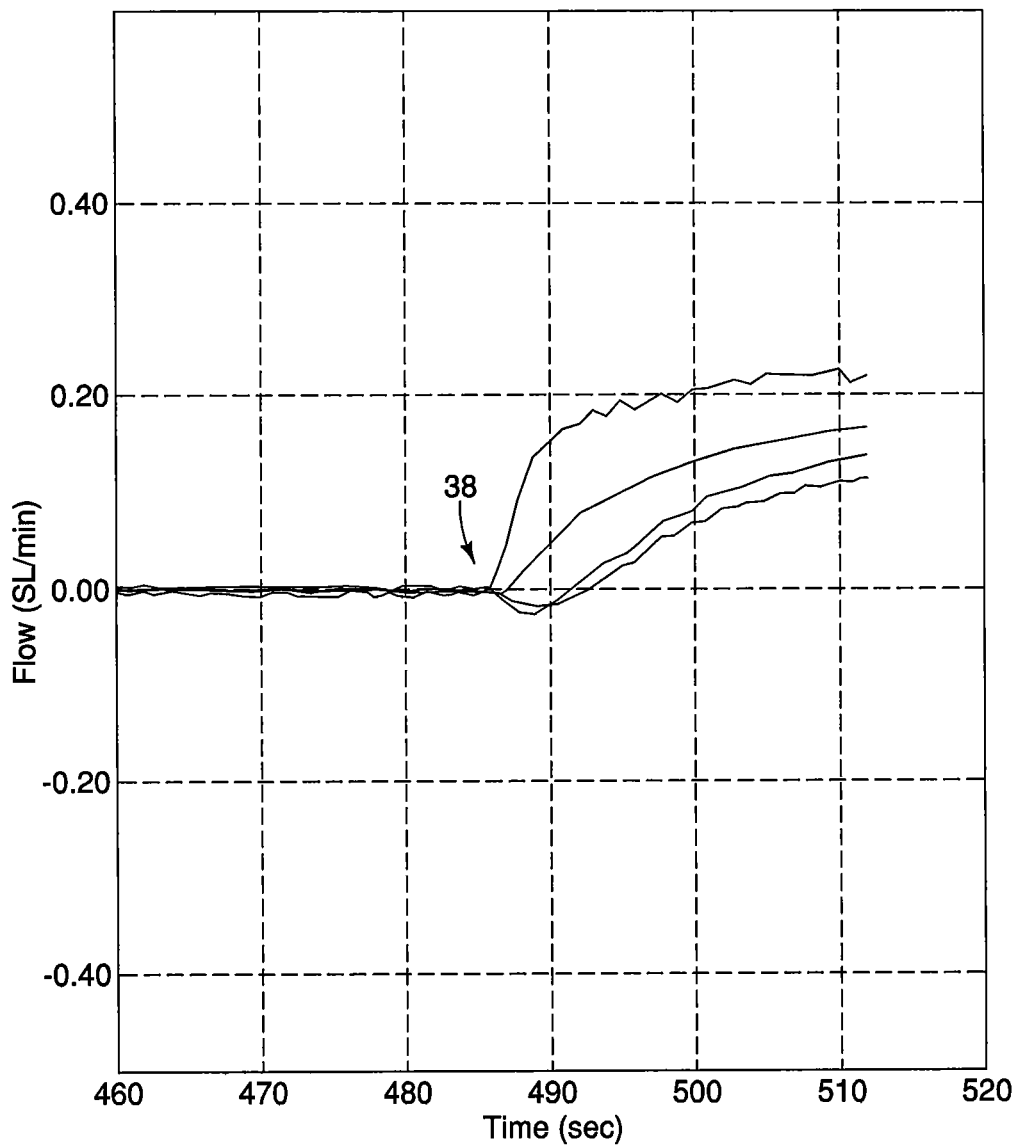
FIG. 8 illustrates that the leak created in FIG. 5 is immediately sensed by the flow sensors.
Figure 9:
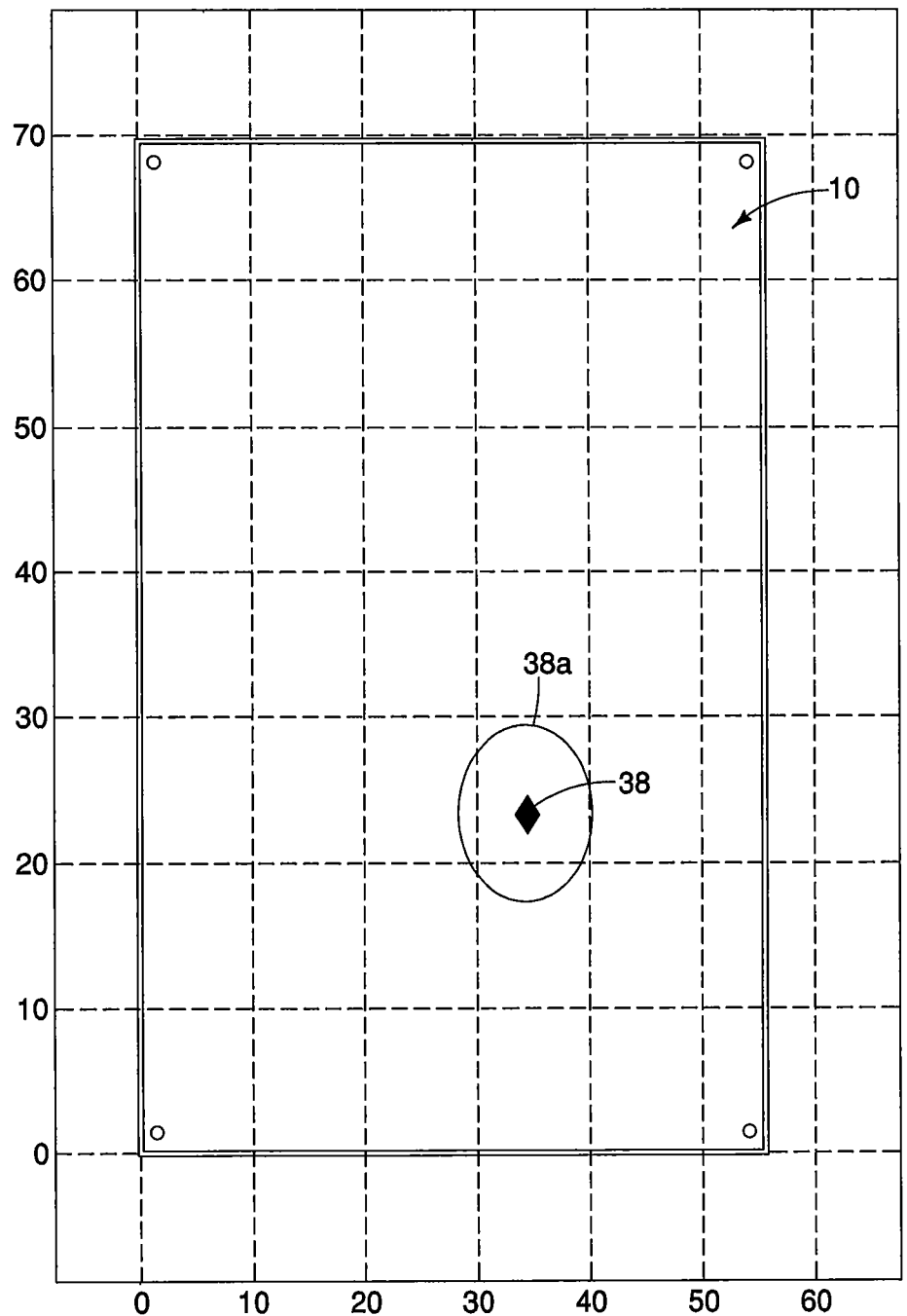
FIG. 9 illustrates the prediction of the leak location in FIG. 5.

An example of leak localization is described below using the test arrangement illustrated in FIG. 5, wherein a simulated vacuum bag 10 was sealed down onto a test bench (not shown). Vacuum hoses 30 were coupled to the four corners of the simulated vacuum bag 10 and a vacuum was applied to hoses 30. As seen in FIG. 6 the mass flow rate for each of the four hoses 30 was monitored and plotted as the volume between the simulated vacuum bag 10 and the test bench was evacuated. The flow-rate over time plot of FIG. 7 confirmed that there were no leaks, as the mass flow rate fell to zero and remained at zero. A pin hole was then made in the simulated vacuum bag 10 so as to create a pinhole leak 38 of approximately two inches of mercury pressure drop per minute. As seen in FIG. 8, pinhole leak 38 was immediately sensed by the flow sensors on each of the four hoses 30, with flow being indicated from all four vacuum lines 30 commencing at substantially the same time. FIG. 9 shows the results of the software (discussed below) predicting that the location of leak 38 was within area 38a. As may be seen, the predicted location of the leak was very close to the known location of the actual leak 38. With sufficient sensor packages 28 and vacuum lines 30, multiple simultaneous leaks may be identified and located.

In the leak detection method, in one embodiment the gas is other than air so as to perturb the gas flow data. For example the gas may be $CO_2$ or dry $N_2$. In the latter, the sensor(s) would include a moisture sensor.

The sensor packages 28 are unique as compared to the prior art of which applicant is aware in a number of ways:

With regard to the use of inline mass flow sensors 40, appropriately selected and calibrated mass flow sensors 40 may be accurately used in a quantitative manner at the low absolute pressures (high vacuums) and high temperatures typically used in composites manufacturing. This is particularly true for composite manufacturing processes other than vacuum assisted resin transfer moulding (VARTM).

It is advantageous to include not only mass flow sensors 40, pressure sensors 42 and, optionally, temperature sensors 44, but also differential pressure sensors 46 to know how much resistance the sensor package 28 is introducing into the vacuum system. Block diagrams of two such sensor packages 28 are shown in FIGS. 3 and 3a. The use of a differential pressure sensor 46 ensures that the mere presence of the sensor package 28 does not harm the part.

Figure 10:
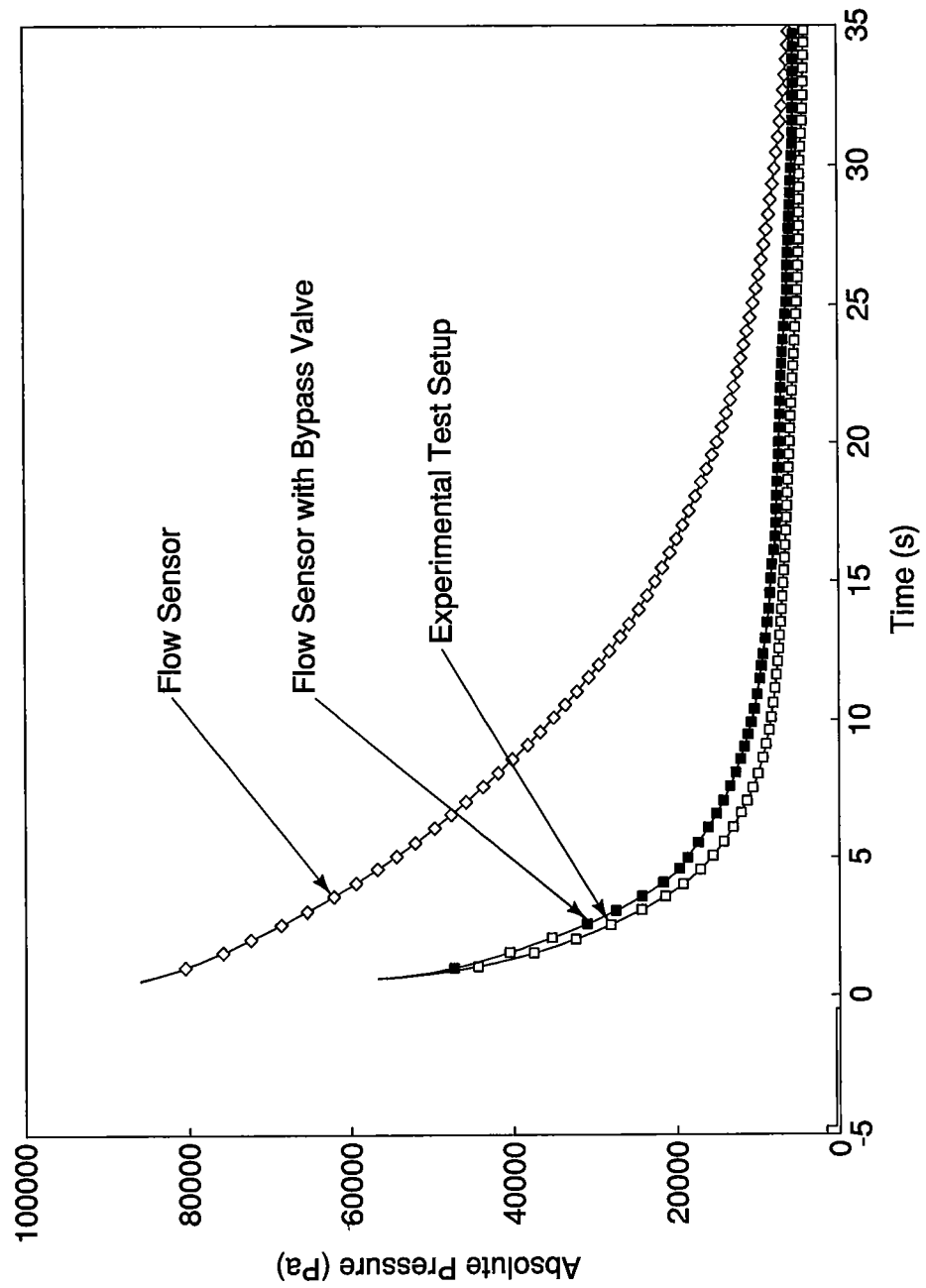
FIG. 10 is a graph of the effect of flow bypass on part pressure profile and speed of evacuation.

The gas flow characteristics measured by sensor packages 28 are used to generate the gas flow data, such as the shape of the curve or profile of the gas flow vs. time, or pressure vs. time, etc. graphs as seen for example in FIGS. 8 and 10 respectively. The profiles are 'fingerprints' of a particular part 26 and can be used to identify, characterize, and rank the response of a given part 26, even before the part has been completely evacuated. Other data manipulation, including the integration of the gas flow history (with appropriate zeroing and base lining), may provide invaluable insight into the performance of the part during manufacturing.

Defect information may be used to identify not only gas based defects and leaks, but also features such as bag bridging, misalignment of moulds or tooling, caul plates, and other features, as well as excessive gaps and other unacceptable features.

Figure 11:
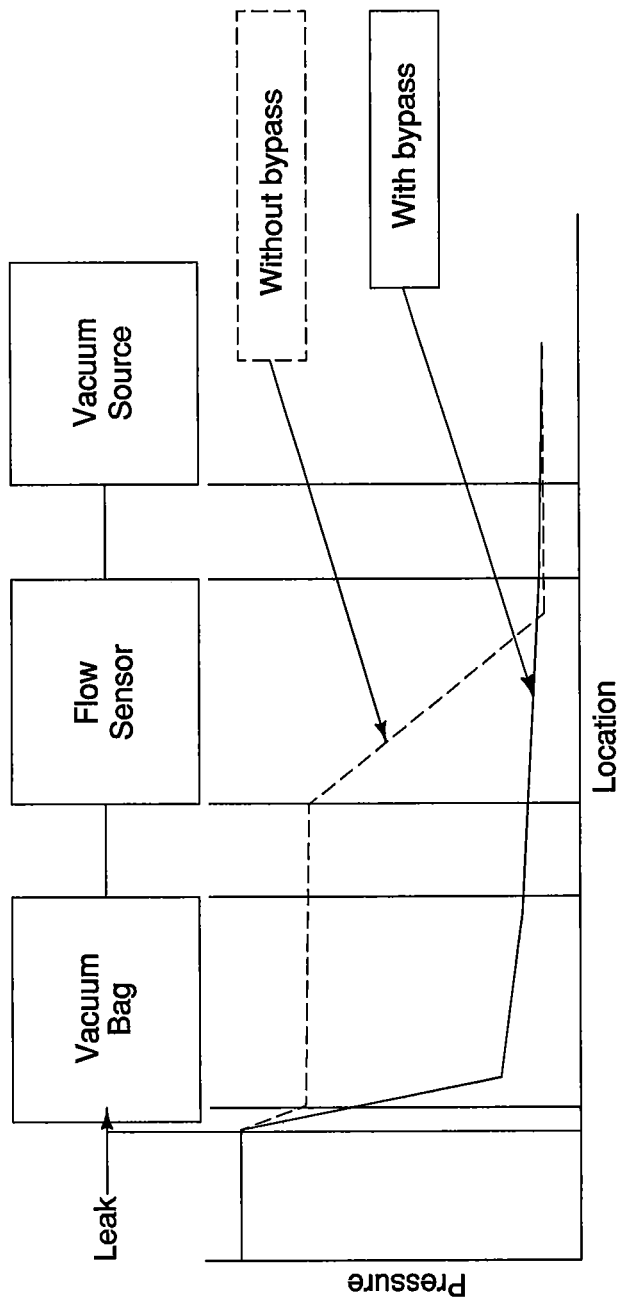
FIG. 11 is a graph of the effect of flow bypass on part pressure profile showing that without bypass the part pressure remains high in the presence of a large leak.
Figure 12:
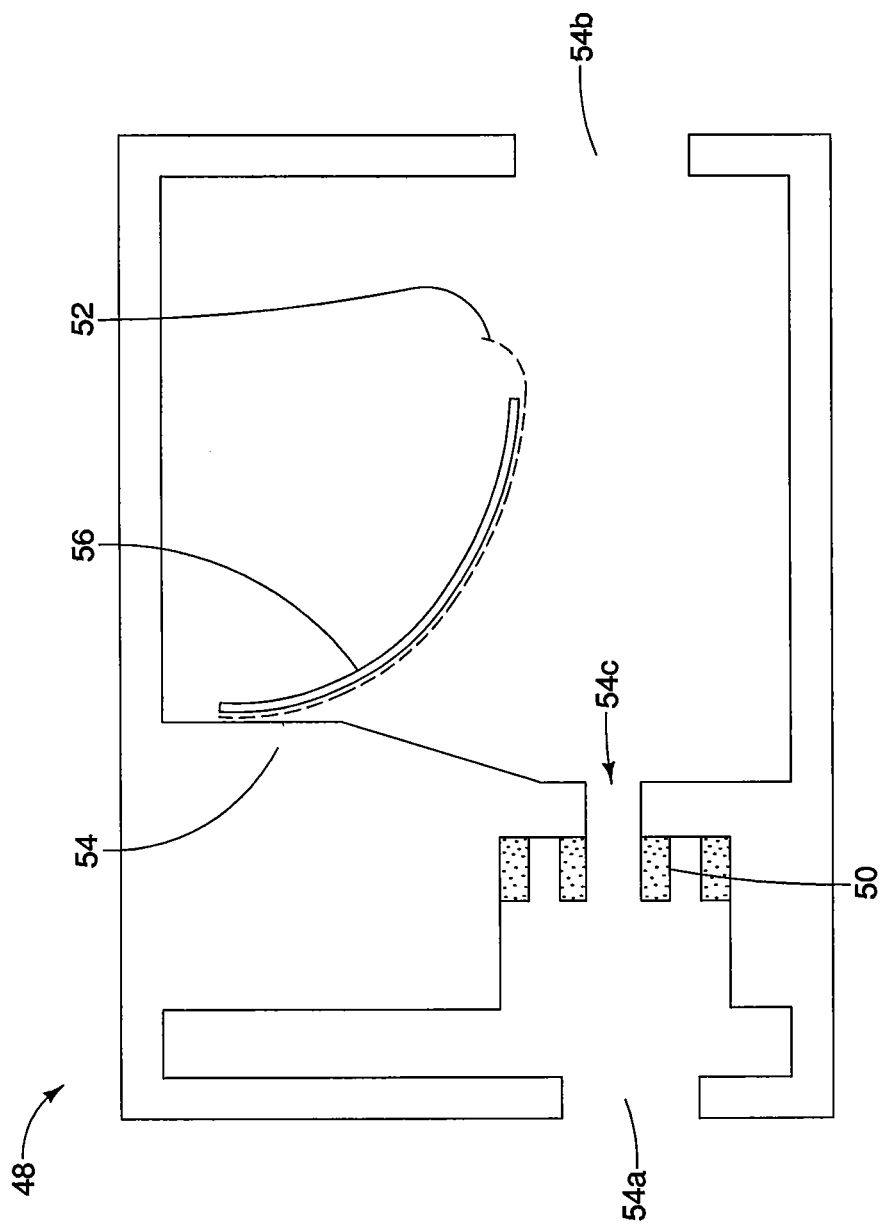
FIG. 12 is, in a cross sectional view, a schematic of a bypass having a reed valve.

Inline mass flow sensors 40 constrict the flow significantly, and therefore may create unacceptable pressure drops across the sensor at high flow rates. This has two distinct disadvantages: (a) longer evacuation times as illustrated in FIG. 10, and (b) unacceptable pressure increase across the sensor in the case of a leak as illustrated in FIG. 11. Therefore, a bypass which includes a bypass valve 48 such as seen in FIG. 12 may be advantageously employed in certain embodiments of sensor package 28. At high gas flow rates, the bypass valve 48 opens, and the pressure drop across the sensor package is acceptably small as seen in FIGS. 10 and 11. Gas flow rates may still be measured by careful calibration and use of both the gas flow rate measurement and the differential pressure loss across the sensor package. At low gas flow rates the bypass valve 48 closes, and all of the gas flows through the gas mass flow sensor 40.

One bypass embodiment such as seen in FIG. 12, and which is not intended to be limiting, may use one or more magnets 50 or other source(s) of a magnetic field to preload a reed 52, shown in the open position, that, when in its closed position, closes the bypass valve 48. In the illustrated embodiment bypass valve 48 has a housing or body 54 having an inlet 54a and an outlet 54b. A conduit 54c extends between the inlet and outlet. Conduit 54c has magnets 50 mounted at the upstream side of conduit 54c. Reed 52 and flexible stopper 56 overlay the downstream end of conduit 54c so as to close conduit 54c when valve 48 is closed. Stopper 56 and/or reed 52 are made of or contain material which is magnetically attracted to magnets 50, so that when stopper 56 and reed 52 are in their closed position overlaying conduit 54c so as to close off flow therethrough, a threshold pressure must be reached in inlet 54a to overcome the magnetic latching of stopper 56 and reed 52 over conduit 54c. Once the magnetic latch is overcome by the pressure in inlet 54a reaching the threshold pressure for the latch to open, flexible reed 52 and stopper 56 abruptly swing or bend to their open position illustrated, that is, a substantially fully open position thereby allowing gas flow through conduit 54c. Thus, once the pressure increases to a critical value due to too much flow, reed 52 releases from magnet 50 and jumps to its open position, quickly dropping the pressure and resistance significantly. This is useful in a situation where there is a high flow rate from a leak, so that the sensor package does not introduce harm to the part by keeping the part pressure high. Additionally, although bulkier, it may be desirable to have active bypass control using solenoid valves (not shown). Other forms of bypass or bypass valves would also work as would be known to one skilled in the art.

In the bypass design of FIG. 12, the reed valve is sized to achieve the desired opening and closing behaviour. The crisp opening and closing of reed 52 is determined by the magnetic field and strength of the magnets 50, and by the flexibility of the reed. An electro magnet may also be used to allow the reed valve's behaviour to be actively controlled. Optionally, the reed may be elastically loaded when in it's closed, no flow condition, so as to snap open once released. Flow sensors, pressure sensors, differential pressure sensors, temperature sensors, and/or a valve position sensor may be usefully included. Stop 56 is optional, and is used to limit the deflection of reed 52. Reed 52 is advantageously of light weight construction so as to minimize variation in valve behaviour with orientation due to gravity, so that valve performance is independent of the spatial orientation of the sensor package. Optionally, the reed's free end may be curved, for example to assist in loading reed 52 elastically when in its closed position.

By combining an appropriately calibrated moisture sensor 58 in either the same sensor package 28 or in a coupled package, the water vapour mass flow rate may be calculated at the same time as the total gas mass flow rate. The history of the water vapour mass flow rate may be manipulated in the same manner as the manipulation of the total gas mass flow rate discussed above. The combined analysis of total and water vapour mass flow rate may be used in decision making as described in the system level descriptions below. Instead of moisture sensors 58, other chemical sensors, typically micro-electro-mechanical (MEMS) based, may also be used in similar fashion, providing additional data interpretation opportunities.

Figure 13:
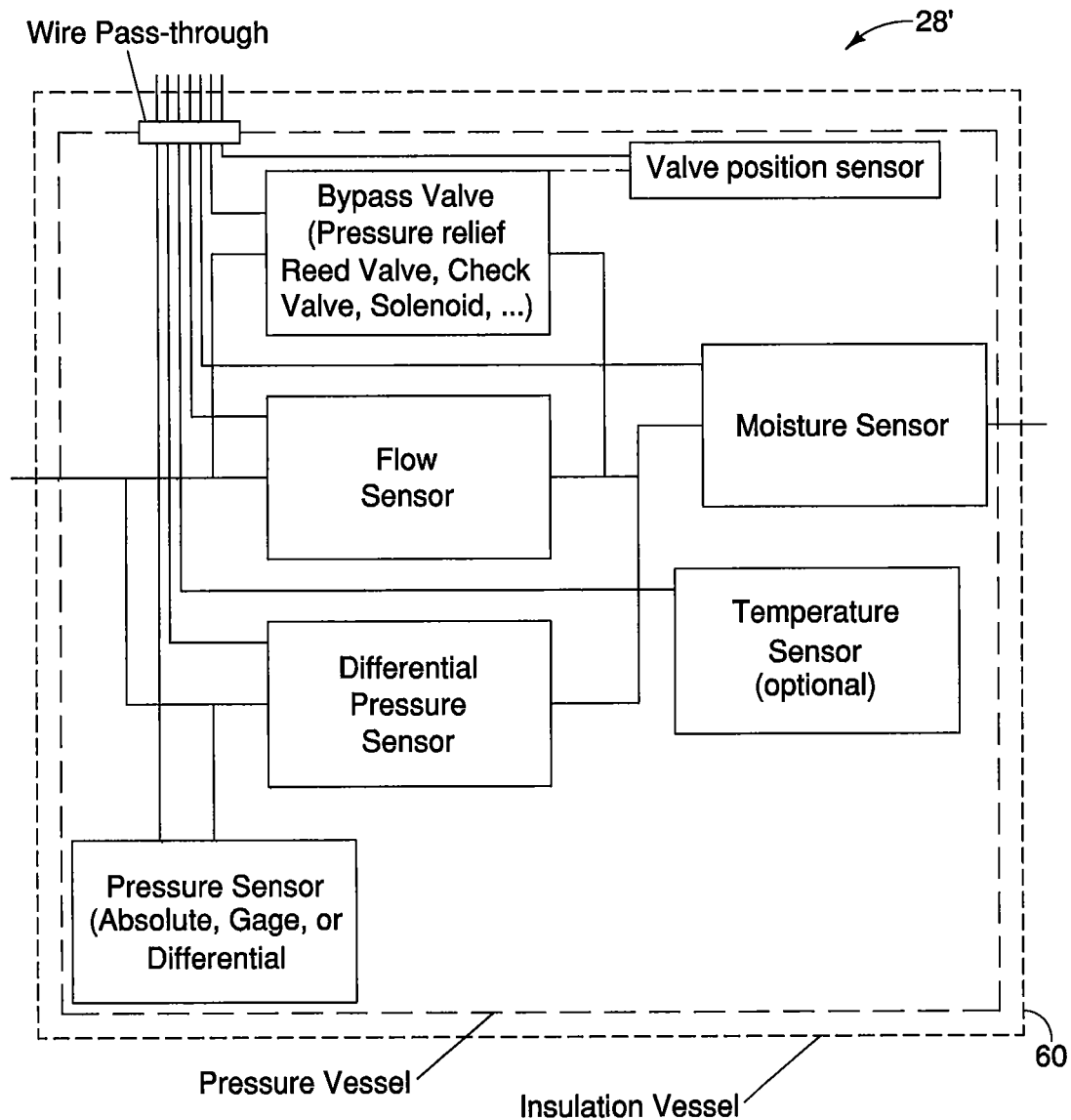
FIG. 13 is a block diagram of a high temperature (and optionally high pressure) sensor package.

A high temperature, high pressure resistant sensor package 28' such as seen in FIG. 13 may be employed so that the measurements may be made during the manufacturing cycle, and not just during the bagging/preparation phase. The sensor packages 28 can be placed either outside the oven or autoclave, and thus see lower temperatures and/or pressure, or if suitably 'hardened', as for example in the embodiment of sensor package 28, may be placed inside the oven or autoclave, directly off the part 26, allowing for maximum accuracy and fidelity of information. One option is to insulate the signal conditioning from thermal effect by placing the signal conditioning outside the oven or autoclave. Another option is to use high temperature electronics.

In a moisture/gas flow design, a resistance or capacitance based humidity sensor may be mounted in line with the flow sensor.

In the high temperature (and optionally high pressure) sensor package 28' of FIG. 13, sensors are protected from high pressure by being placed inside a sealed unit, and/or are partially protected from high temperature by being placed inside an insulated unit 60. Electronics may be similarly protected, if necessary, from pressure and temperature.

Figure 14:
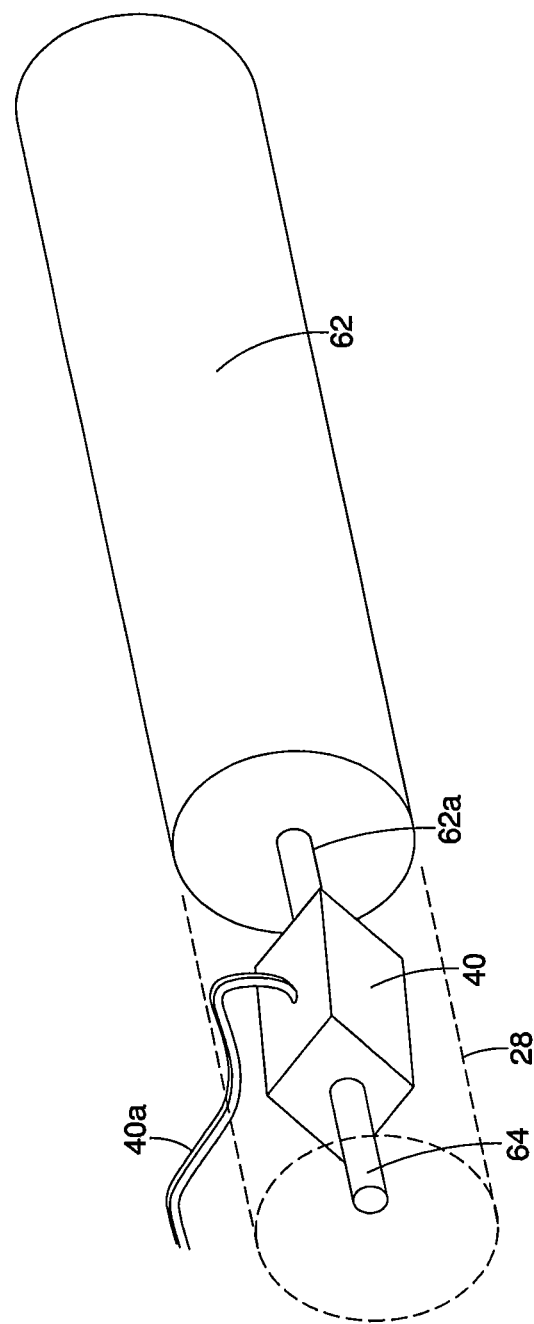
FIG. 14 is, in perspective view, an example of the use of a sensor package on an insert such as a bladder.

As seen in FIG. 14, sensor packages 28 (shown in dotted outline), such as high temperature sensor packages 28'; if placed within the oven or autoclave during cure may be attached directly to inserts such as bladders 62. A mass flow sensor 40, and its associated wiring 40a, is shown mounted in-line on tubing 64. Tubing 64 is sized to assist in providing laminar flow. Tubing 64 is mounted to port 62a on bladder 62.

Figure 15:
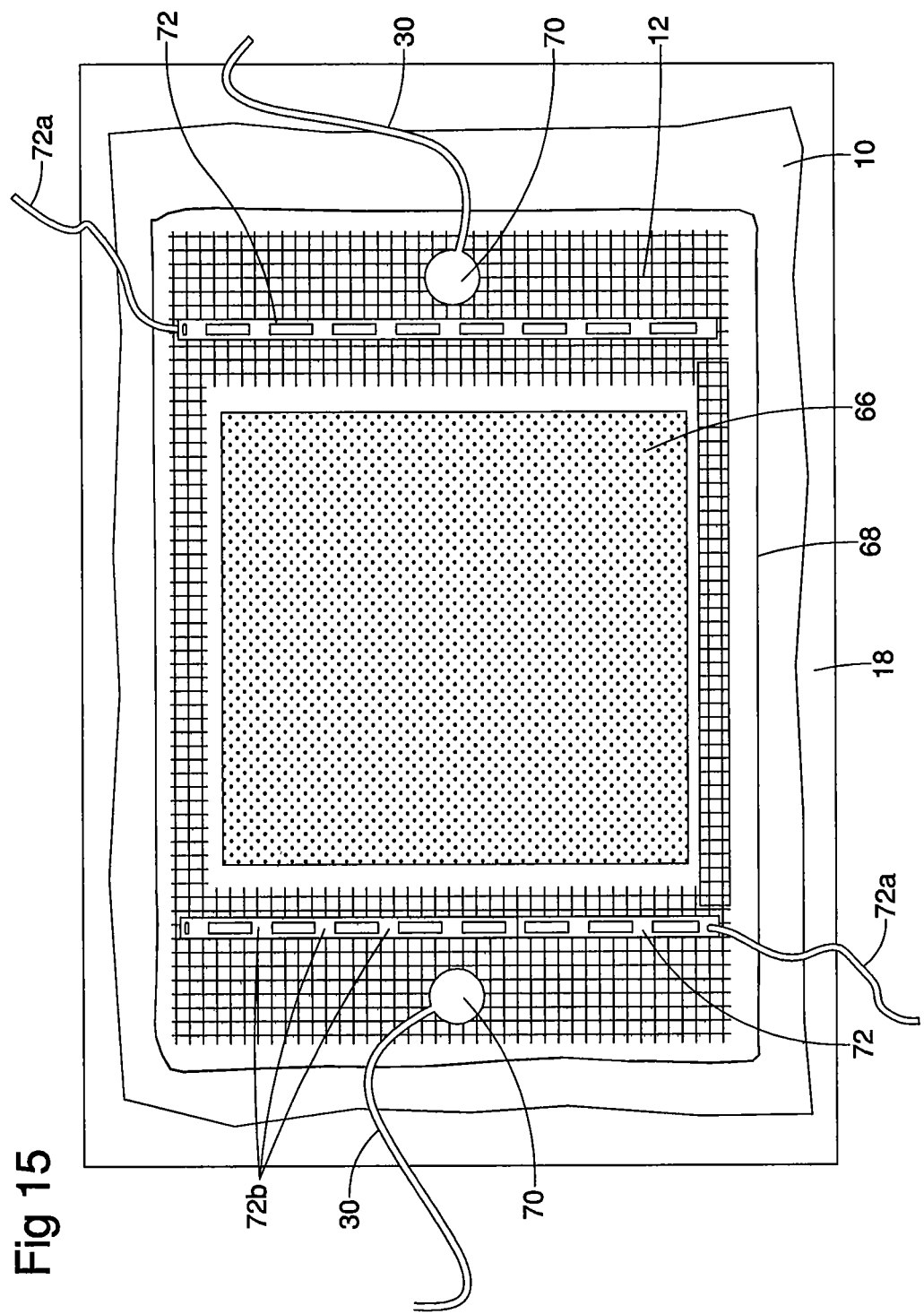
FIG. 15 is an example of the use of under-bag flow sensors.

As seen in FIG. 15, individual flow sensors in the form of local flow sensors 72b mounted on flow belts 72 may be placed under the vacuum bag 10 (or inside the closed cavity as the case may be) to identify source and direction of gas flow. Thus as may be seen, bagging material 10 overlays a part 66 on tool or mould 18 and is sealed to tool or mould 18 by a bead of sealant 68. Vacuum is applied via vacuum hoses 30 attached to vacuum ports 70. A breather 12 and flow belts 72 are interleaved between bagging material 10 and tool or mould 18. Wiring 72a extends from flow belts 72 through bagging material 10.

Figure 15A:
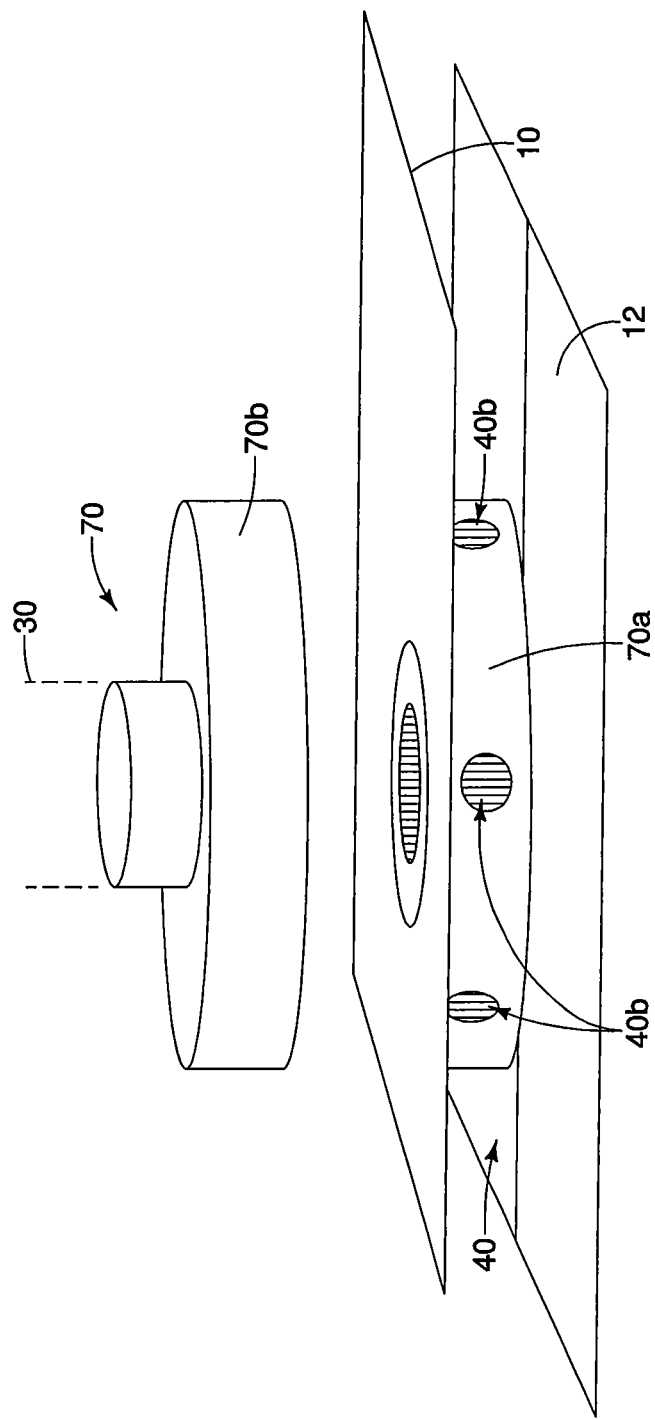
FIG. 15a is an example of a vacuum port probe with directional radial flow sensors.

As seen in FIG. 15a, another option is to integrate flow sensors 40 with the vacuum port 70. Thus, directional radial flow sensors 40b, which may identify the direction from which the gas flow originates, are mounted into a vacuum port housing 70a. A vacuum port chuck 70b mounts onto housing 70a so as to support a vacuum hose 30 mounted thereon and so as to seal bagging material 10 therebetween.

Figure 16:
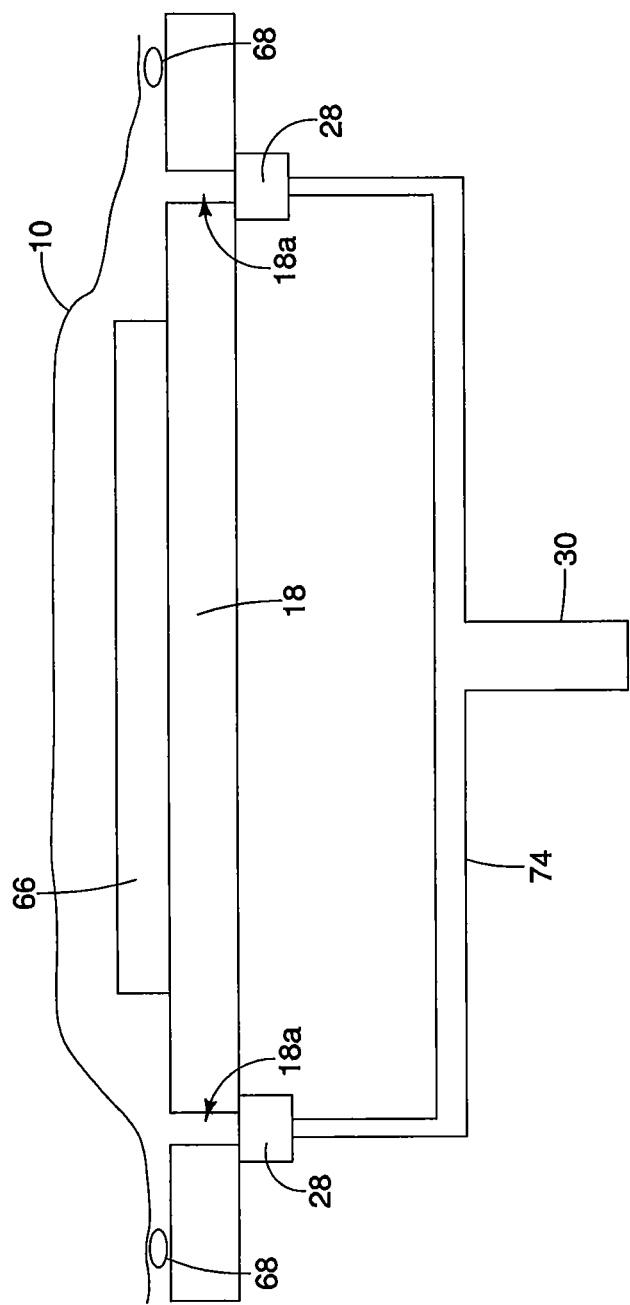
FIG. 16 is an example of sensors installed within the moulds or tooling.

Flow sensors 40 mounted in sensor packages 28, may as seen in FIG. 16 be installed directly on, or within, the tool or mould 18 for ease of use. Thus as may be seen, again bagging material 10 overlays a part 66 on tool or mould 18 and is sealed to tool or mould 18 by a bead of sealant 68. Vacuum ports 18a are formed in tool or mould 18. Sensor packages 28 are mounted in fluid communication with vacuum ports 18a. A manifold 74 is mounted to sensor packages 28 so as to connect sensor packages 28 and vacuum ports 18a with vacuum line 30.

Software

Figure 17:
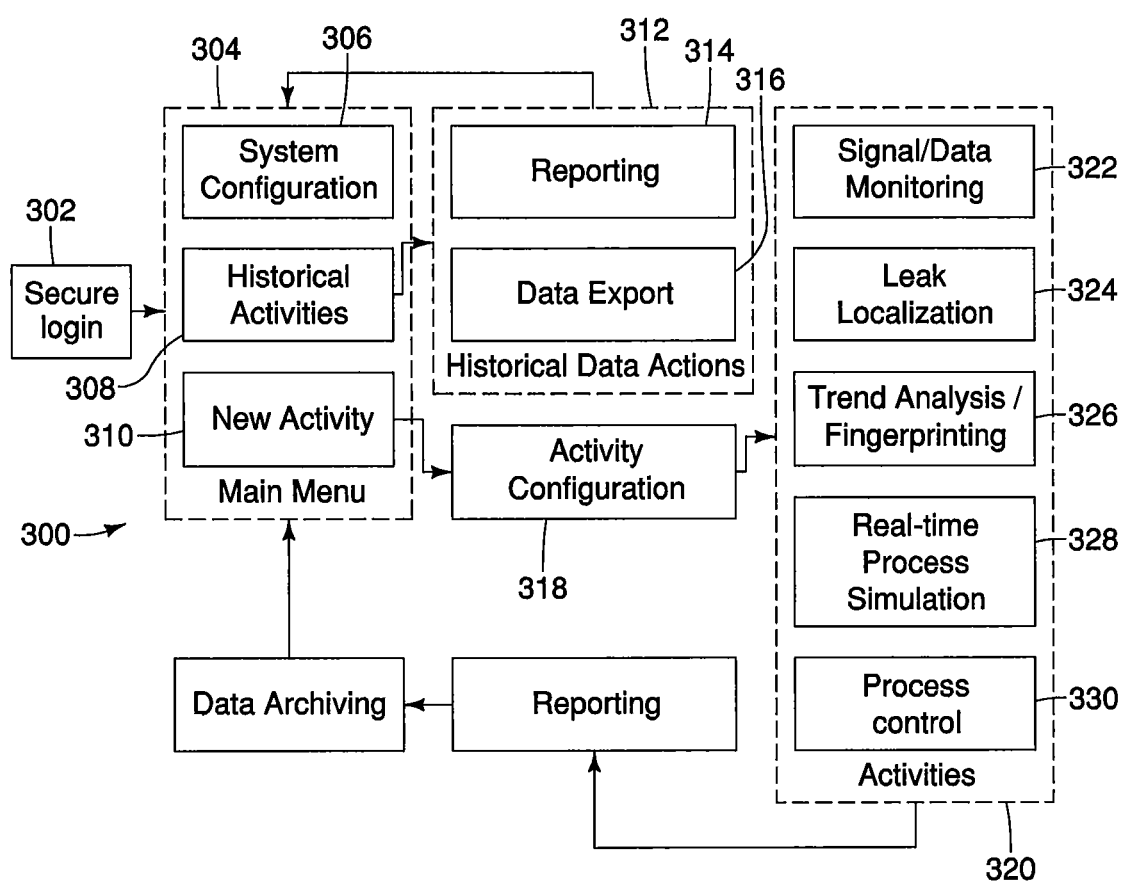
FIG. 17 is a high level schematic of system operation illustrating software flow.
Figures 18A, 18B:
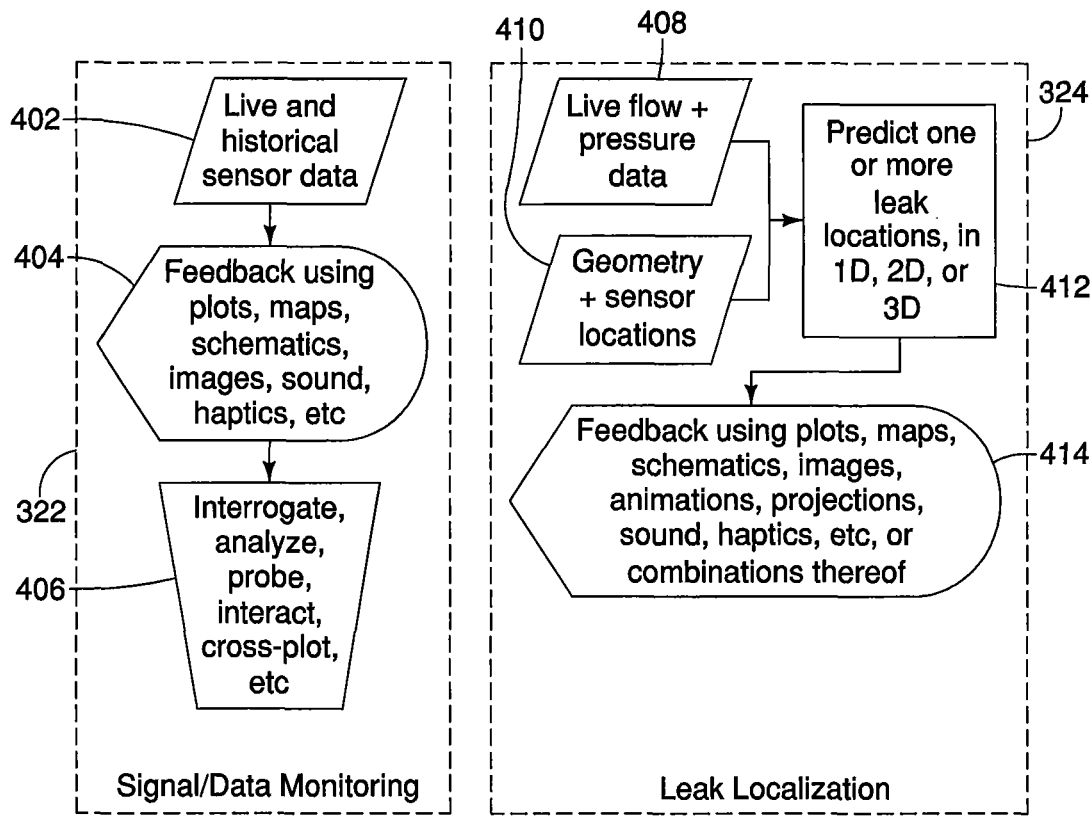
FIG. 18a is a schematic of system operation illustrating signal/data monitoring.
FIG. 18b is a schematic of system operation illustrating leak localization.
Figure 19:
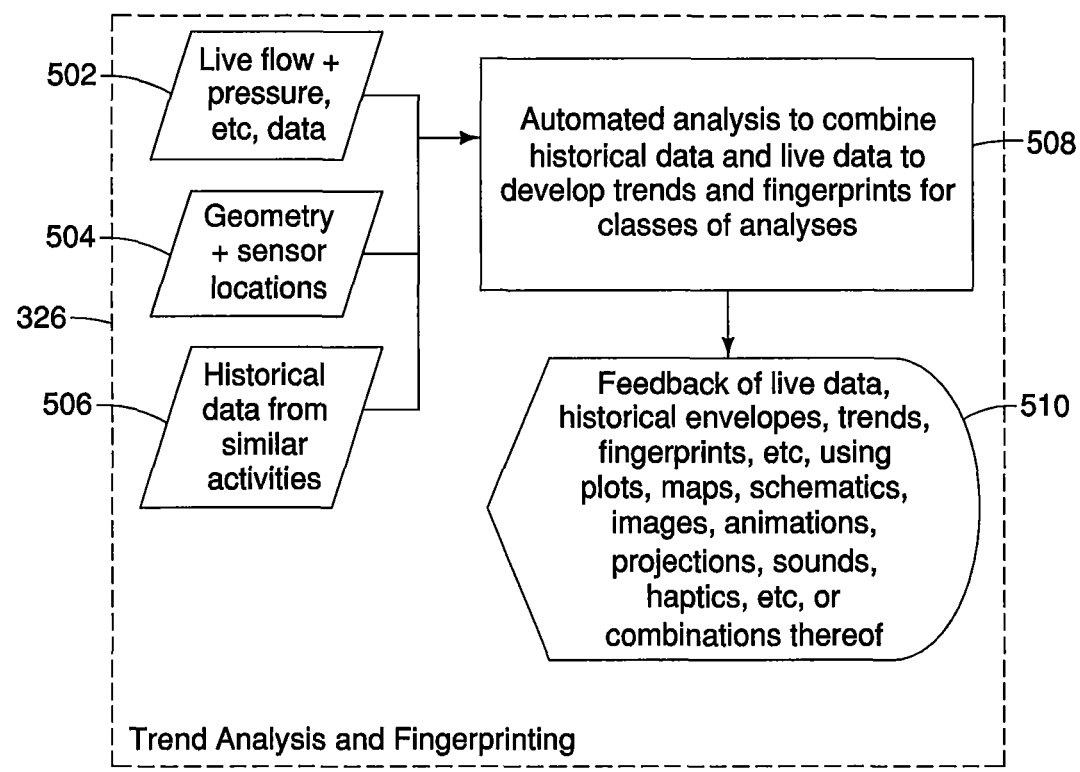
FIG. 19 is a schematic of system operation illustrating trend analysis and fingerprinting.
Figure 20:
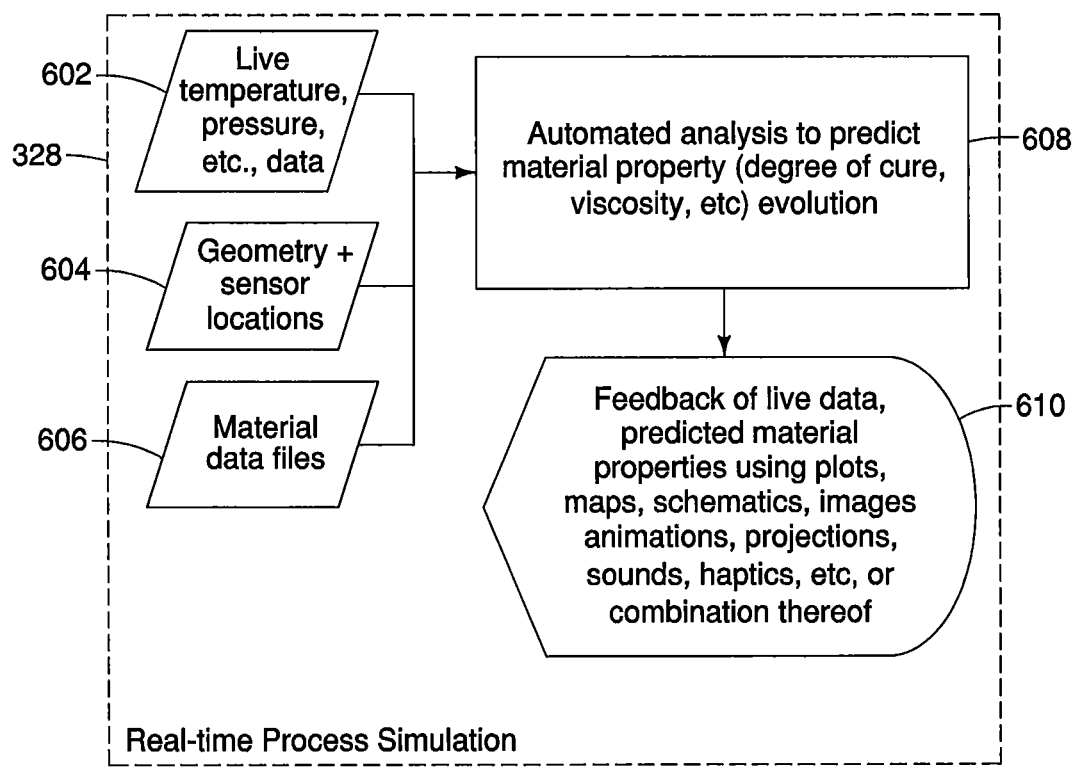
FIG. 20 is a schematic of system operation illustrating real time process simulation.
Figure 21:
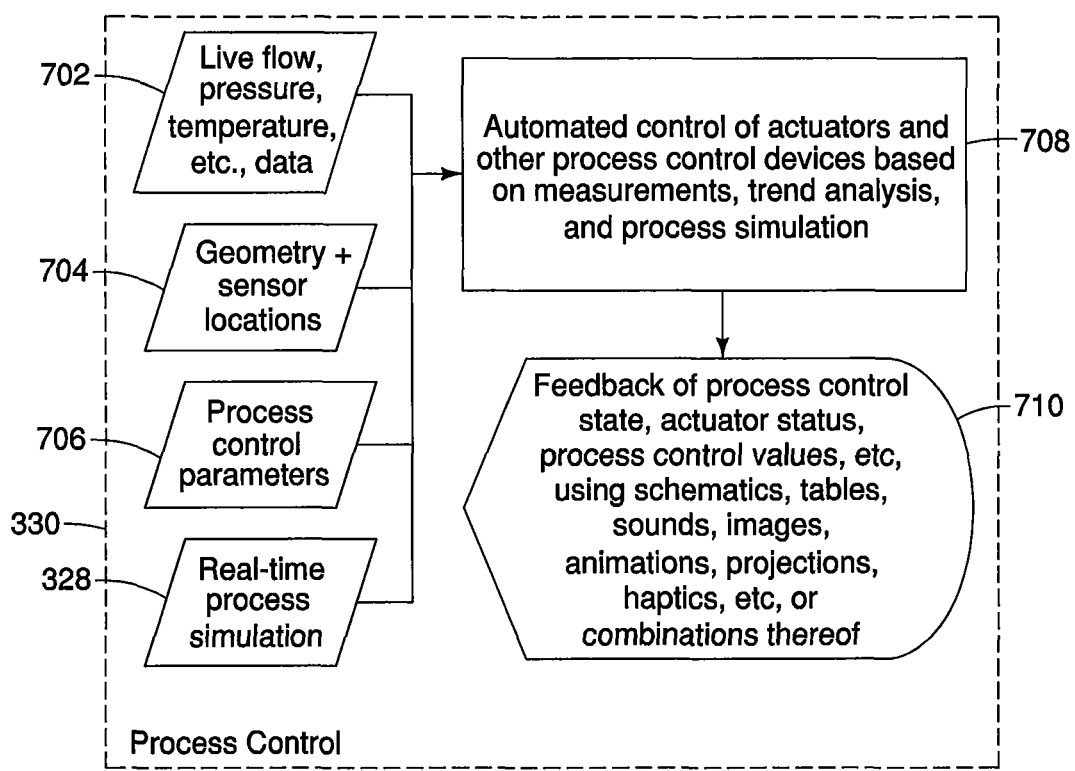
FIG. 21 is a schematic of system operation illustrating process control.

By way of overview, one example, which is not intended to be limiting, of a high level system level software flow is shown schematically in FIG. 17, signal/data monitoring and leak localization is shown in FIGS. 18a and 18b respectively, trend analysis and fingerprinting in FIG. 19, real time process simulation (of particular value when the system is used during the cure process with elevated temperature and pressure) in FIG. 20, and process control (where the process can be modified to minimize the effect of any leak or other deviation from the normal manufacturing process) in FIG. 21. The system architecture is shown in greater schematic detail in FIG. 22.

In FIG. 17, system level software flow 300 includes, in order of operation, secure login 302 which provides access to main menu 304. Main menu 304 provides access to system configuration 306, historical activities 308, or new activity 310. Historical activities 308 gives access to historical data actions 312 which itself provides for reporting 314 or data export 316. New activity 310 gives access to activity configuration 318, which gives access to activities 320. Activities 320 gives access to signal or data monitoring 322, leak localization 324, trend analysis or fingerprinting 326, real-time process simulation 328, or process control 330.

As seen in FIG. 18a, the signal/data monitoring 322 may include live and historical sensor data 402 to provide feedback 404 which may include plots, maps, schematics, images, sound, haptics, etc. These are used in the determining step 406 to interrogate, analyze, probe, interact, cross-plot, etcetera, the data from step 404.

The feedback as described throughout this specification may, at least in part, be based on, or correspond to, the spatial relationship between the user/worker/inspector/receiving the feedback and the membrane or mould as the case may be.

As seen in FIG. 18b, leak localization 324 may include using live flow and pressure data 408, and the geometry and sensor location information 410 to predict in step 412 the locations of one or more leaks in one or more dimensions. Feedback is provided in step 414 using plots, maps, schematics, images, animations, projections, sounds, haptics, etcetera or any combinations thereof to show the predicted leak locations.

As seen in FIG. 19, trend analysis and finger printing 326 may include live (that is, real-time) flow, pressure, etc. data 502, geometry and sensor location data 504, and historical data 506 from similar activities. The data is analyzed in step 508 to combine historical data and live data to develop trends and fingerprints for classes of analyses, such as finite element analysis. Feedback is provided in step 510 of live data, historical envelopes, trends, fingerprints, etc. using plots, maps, schematics, images, animations, projections, sounds, haptics, etc. or any combination thereof.

As seen in FIG. 20, real-time process simulation 328 may include live temperature, pressure, etc. data 602, geometry and sensor location data 604, and/or material data files 606. The data is analyzed in step 608 to automatically predict material property evolution, for example the evolution of the degree of cure, viscosity, etc. Feedback is provided in step 610 of live data, predicted material properties using plots, maps, schematics, images, animations, projections, sounds, haptics, etc. or any combinations thereof to show the evolution of the material properties.

As seen in FIG. 21, process control 330 may include live flow, pressure, temperature, etc. data 702, geometry and sensor location data 704, process control parameters 706 and real time process simulation 328 so as to provide automated control of actuators and other process control devices in step 708 based on measurement devices, trend analyses and process simulation. Feedback is provided in step 710 of the process control state, actuator status, process control values, etc. using schematics, tables, sounds, images, animations, projections, haptics, etc. or any combinations thereof.

Figure 22:
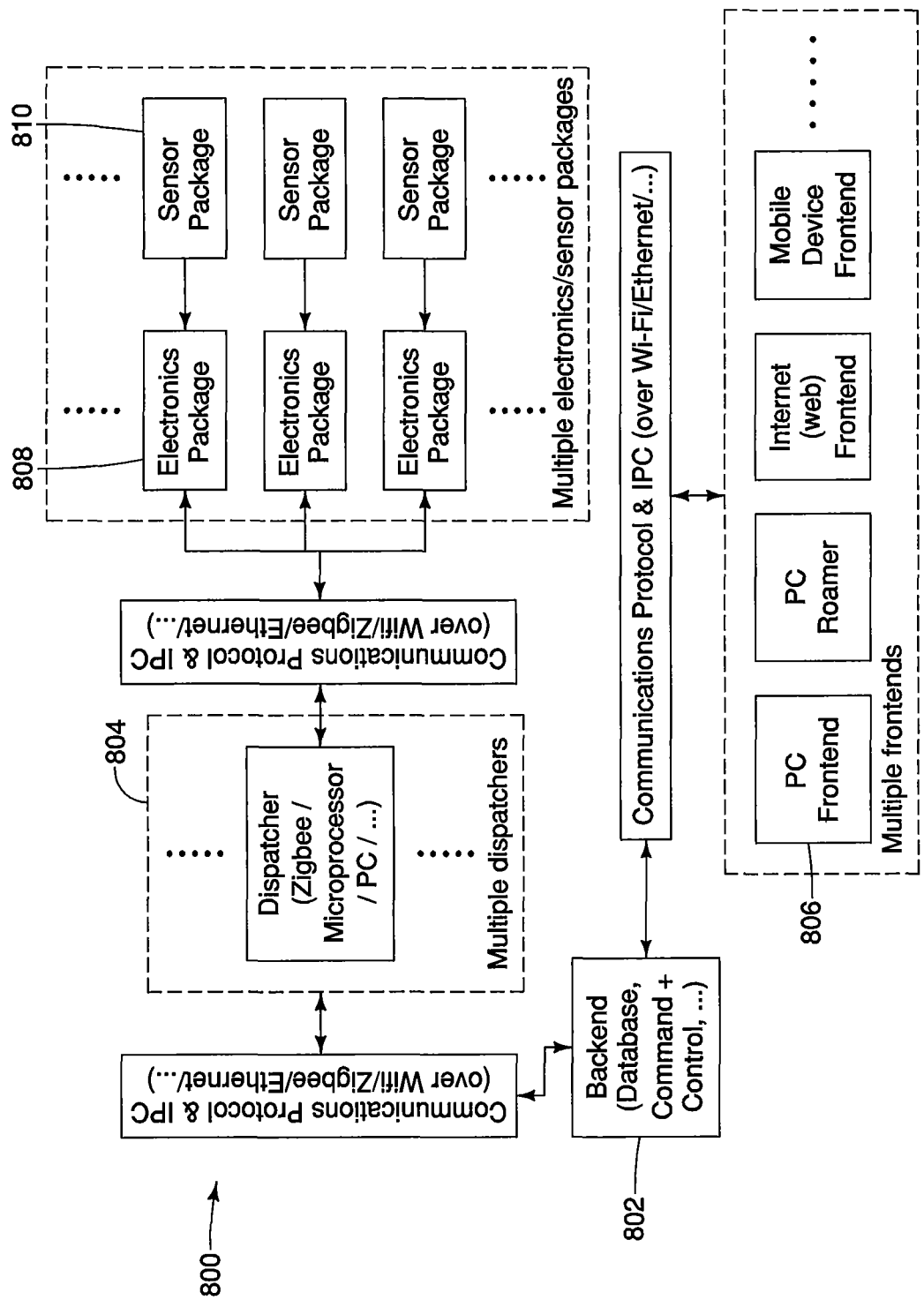
FIG. 22 is a schematic of system operation illustrating system architecture.

As seen in FIG. 22, system architecture 800 includes back end 802. Back end 802 includes back end database 32. Back end database 32 communicates via appropriate communications protocols as would be known by one skilled in the art, with a dispatcher or multiple dispatchers 804 and with multiple front ends 806. Front ends 806 may include front ends 34 or 36 illustrated in FIG. 2a. Dispatchers 804 communicate with electronic packages 808 which receive data from sensor packages 810, which may include sensor packages 28.

The system level architecture described may include:
1) Use of flow and other data from multiple sensor packages, dimensions, and materials to predict the location of a leak.
2) Instantaneous feedback to the users of the system, using static and roaming devices and computers including visual, audio, tactile, or other sensory feedback, and may also include:
   a. the ability of the users to add comments to the system indicating what they are doing,
   b. the ability of the system to interface with other data acquisition and control systems performing other factory tasks (e.g. autoclave or oven controller).
3. Prediction of the type of leak(s) based on the flow behavior or signature, for example, in the bagging material, in the tool or moulds, in the mould or tool seal(s), in the bladder, etc.
4. Use of accumulated data from previously tested parts that allow the integrated and otherwise reduced data from a range of sensor packages to be used to characterize the evacuation behaviour of a given part against the database, leading to correlations with quality, herein referred to as one form of "fingerprinting".

Figure 23:
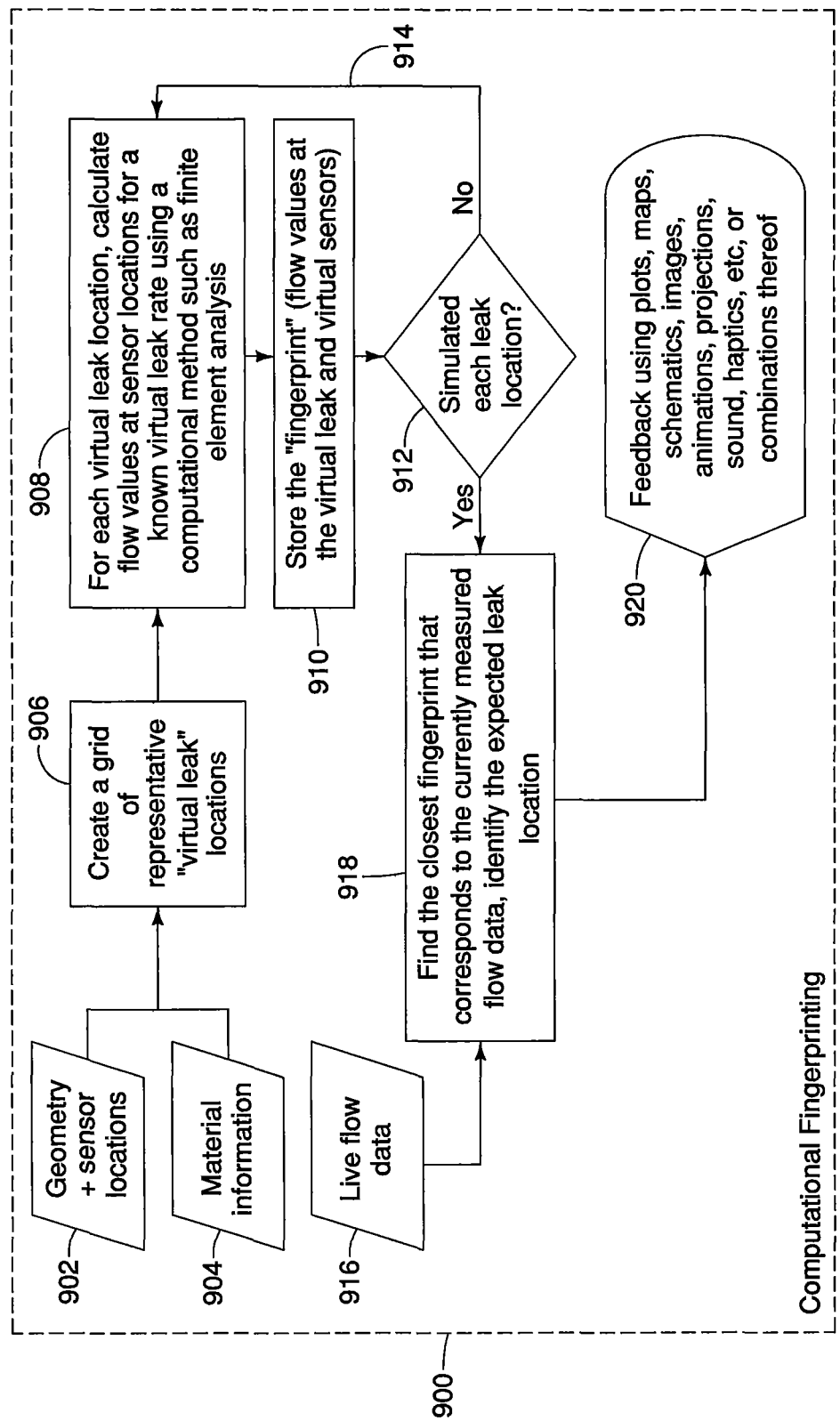
FIG. 23 is a schematic of computational fingerprinting.

As illustrated in the flow chart of FIG. 23, computational fingerprinting 900 includes collecting geometry and sensor location data 902, and material information 904, and processing that information to create a grid of representative virtual leak locations in step 906. In step 908 for each virtual leak location the flow values are calculated at sensor locations for a known virtual leak rate using a computational method such as finite element analysis. In step 910 the flow value at the virtual leak and virtual sensors are calculated and stored as a "fingerprint". At step 912, steps 908 and 910 are iterated in loop 914 until each leak location has been simulated. Once each leak location has been simulated, live flow data 916 is used in comparison step 918 to find the closest fingerprint that corresponds to the currently measured flow data collected in step 916, so as to identify the expected leak location by the matching of the live flow data to the closest corresponding fingerprint. Feedback is provided in step 920 using plots, maps, schematics, images, animation, projections, sounds, haptics, etc., or combinations thereof.

Figure 24:
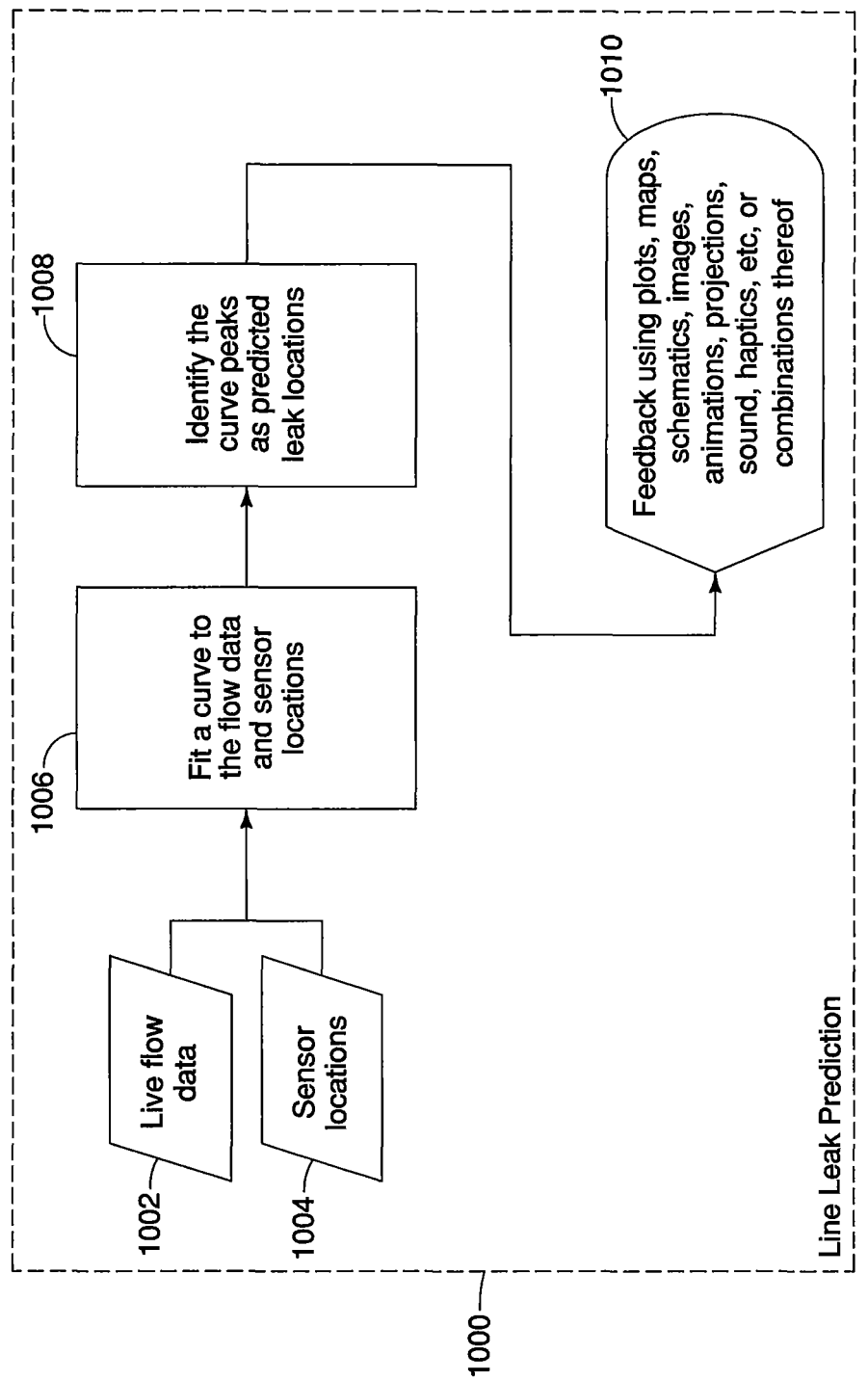
FIG. 24 is a schematic of line leak prediction.

Line leak prediction 1000 is illustrated in the flow chart of FIG. 24. Live flow data is collected in step 1002. Sensor location data is collected in step 1004. In step 1006 curves are fitted to the live flow data and sensor location data from steps 1002 and 1004 respectively. In step 1008 the peaks of the curves fitted in step 1006 are identified and used to predict leak locations. Feedback is provided in step 1010 using plots, maps, schematics, images, animations, projections, sounds, haptics, etc., or combinations thereof.

Figure 25:
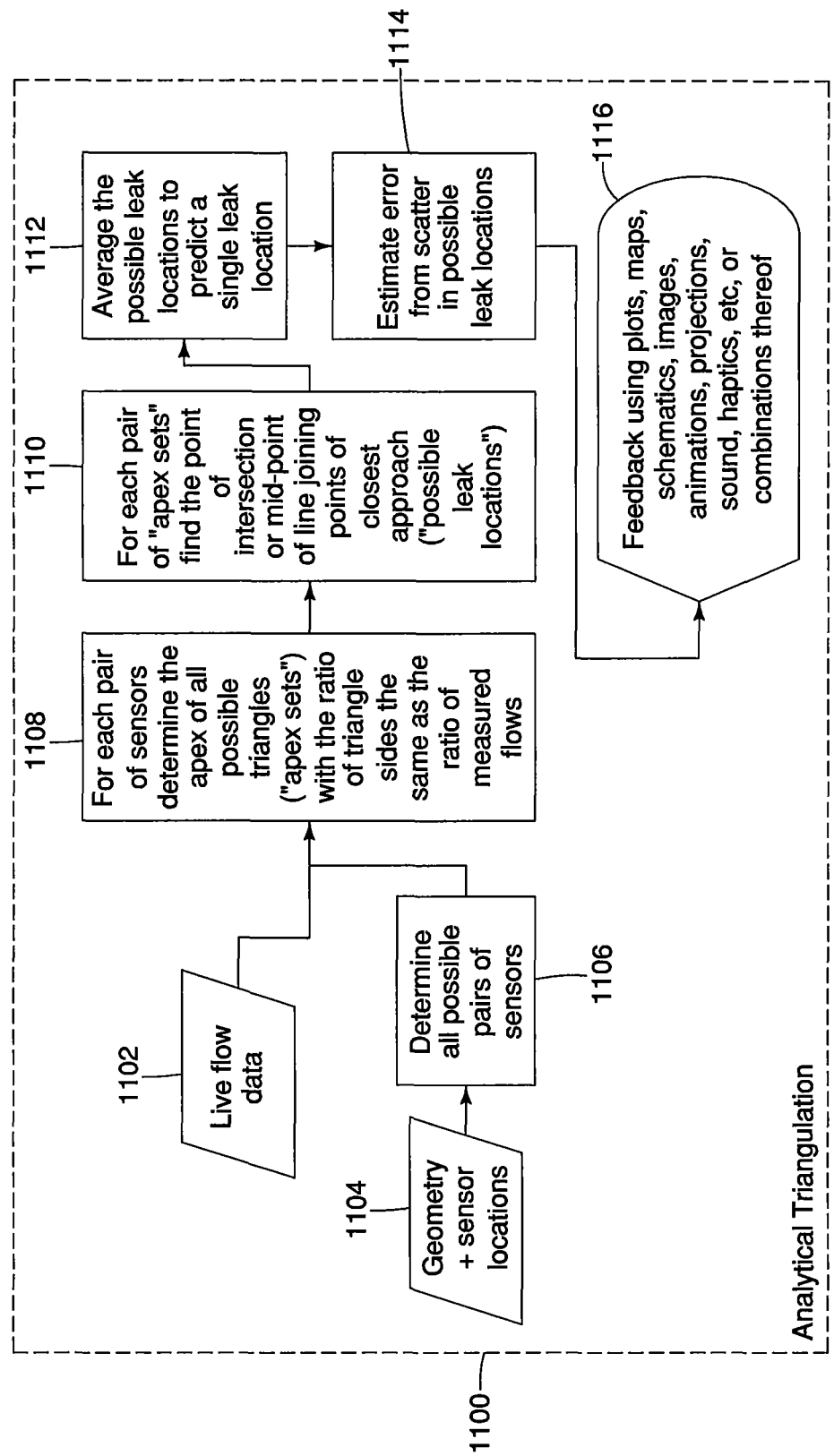
FIG. 25 is a schematic of analytical triangulation.

Analytical triangulation 1100 is illustrated in the flow chart of FIG. 25. Analytical triangulation includes collecting live flow data in step 1102 and collecting geometry and sensor location data in step 1104. In step 1106 all possible pairs of sensors are determined from the data from step 1104. In step 1108, for each pair of sensors determined in step 1106, the apex of all possible triangles (so-called "apex sets") are determined by setting the ratio of the sides of the triangles to be the same as the ratio of the measured flows from step 1102. In step 1110, for each pair of "apex sets" the point of intersection is determined, or where there is no intersection, the mid point of the line joining the points of closest approach is determined so as to indicate possible leak locations. In step 1112 the average of the possible leak locations determined in step 1110 is used to predict a single leak location. The error from the scatter of possible leak locations determined in step 1110 is estimated in step 1114.

In step 1116 feedback is provided using plots, maps, schematics, images, animations, projections, sounds, haptics, etc., or combinations thereof.

Figure 26:
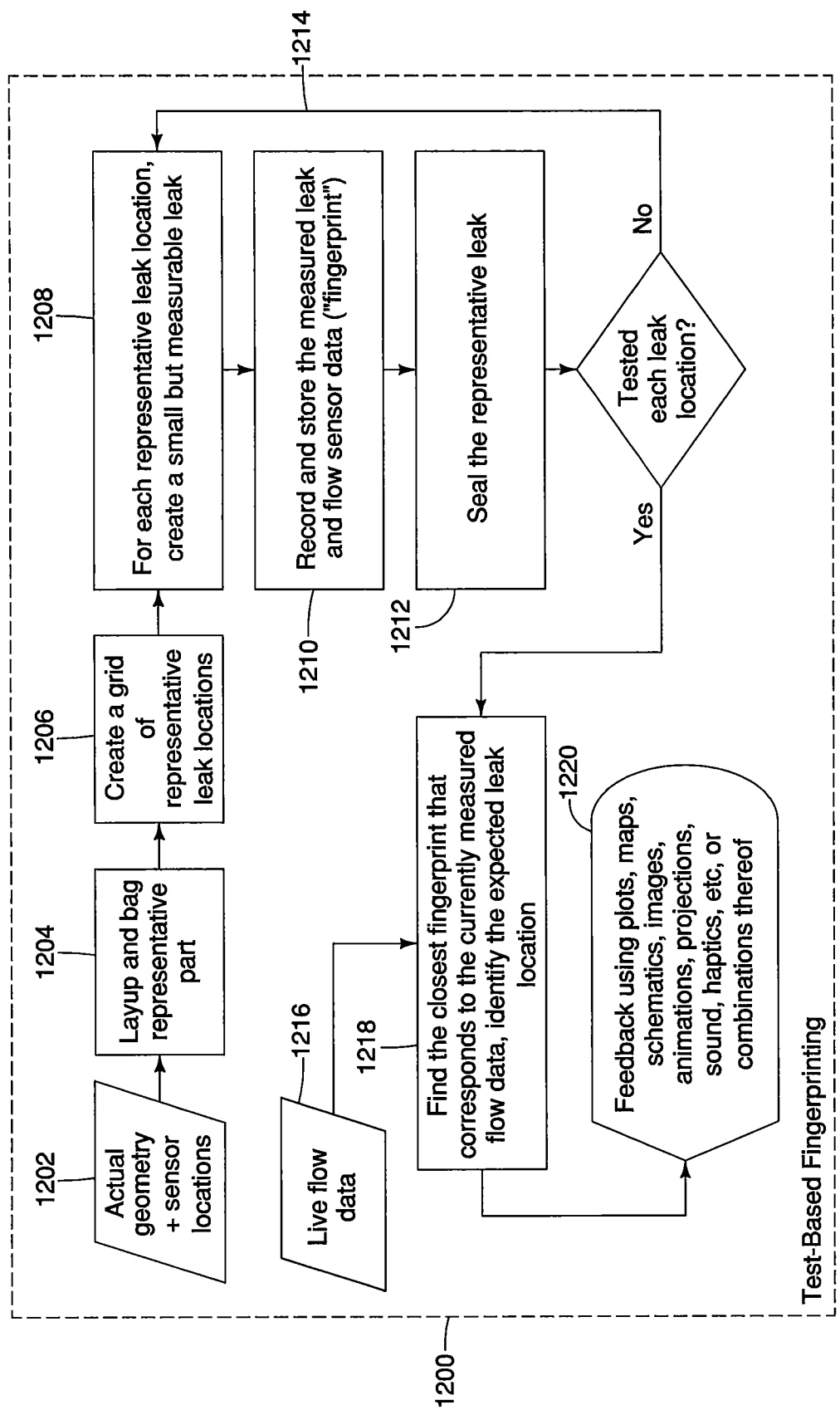
FIG. 26 is a schematic of test-based fingerprinting.

Test-based fingerprinting 1200 is illustrated FIG. 26. Actual geometry and sensor location data from step 1202 is used in step 1204 to lay up and bag a representative part 26 so as to create in step 1206 a grid of representative leak locations. In step 1208 a small but measurable leak is created at each representative leak location from step 1206. The measured leak and flow sensor data from the small leaks created in step 1208 are recorded and stored in step 1210 so as to create a "fingerprint". In step 1212, the representative leak created in step 1208 is sealed and if all of the representative leak locations created in step 1206 have not been tested then loop 1214 iterates the testing to step 1208 for the creation of the next small but measurable leak at the next representative leak location from the grid of representative of leak locations created in step 1206. Live flow data collected in step 1216 is used in step 1218 once all of the testing iterations of steps 1208-1214 have been completed, so as to compare the data from step 1216 with the fingerprints recorded and stored in step 1210 so as to determine in step 1218 which is the closest fingerprint that corresponds to the currently measured flow data and thereby identify the expected leak location. Feedback is provided in step 1220 using plots, maps, schematics, images, animations, projections, sounds, haptics, etc. or combinations thereof.

Figure 27:
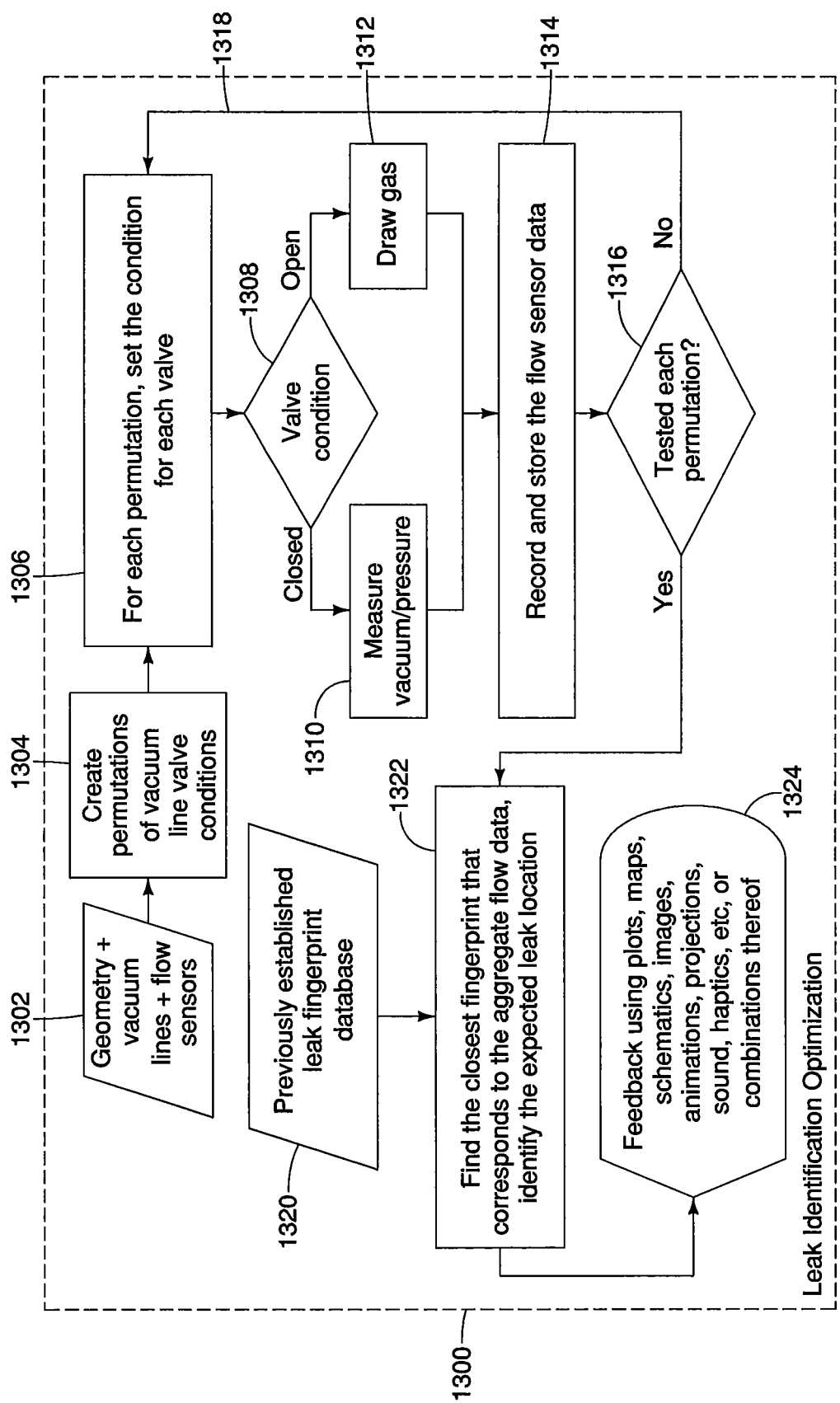
FIG. 27 is a schematic of leak identification optimization.

Leak identification optimization 1300 is illustrated in the flow chart of FIG. 27. Geometry and vacuum lines and flow sensors data is collected in step 1302 and used in step 1304 to create permutations of vacuum line valve conditions. In step 1306, for each permutation in step 1304 the conditions for each valve are set. If for a particular permutation, the valve condition, as determined in step 1308, is closed, then the vacuum/pressure is measured in step 1310, and if the valve condition is open, gas is drawn in step 1312. Following steps either 1310 or 1312, the flow sensor data is recorded and stored in step 1314. If, as determined in step 1316, all of the permutations created in step 1304 have not been tested, then loop 1318 returns to step 1306 so as to set the condition for each valve in the next permutation according to the permutations created in step 1304. Data from a previously established leak fingerprint data base, such as described above, is retrieved in step 1320 and, when in step 1316 it is determined that all of the permutations have been tested, then in step 1322 the flow sensor data recorded and stored in step 1314 is compared to the data retrieved in step 1320 so as to find the closest fingerprint that corresponds to the aggregate flow data to identify the expected leak location. Feedback is provided in step 1324 using plots, maps, schematics, images, animations, projections, sounds, haptics, etc. or combinations thereof.

Figure 28:
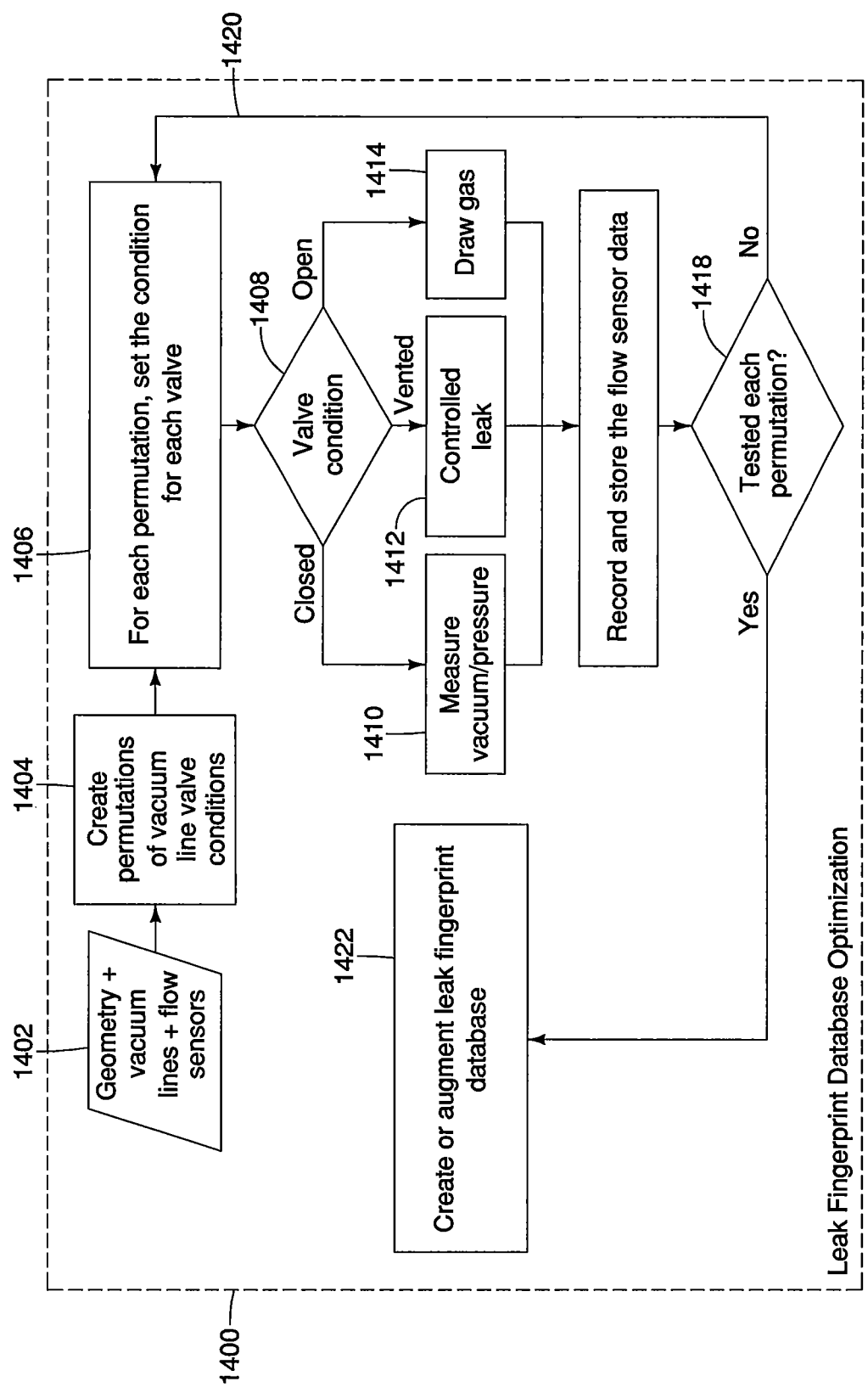
FIG. 28 is a schematic of leak fingerprint database optimization.

Leak fingerprint database optimization 1400 is illustrated in the flow chart of FIG. 28. Geometry and vacuum lines and flow sensors data is collected in step 1402 and used to created permutations of vacuum line valve conditions in step 1404. For each permutation, the condition for each valve is set in step 1406. The valve condition for each permutation is determined in step 1408, and if the valve condition for that permutation is closed then vacuum/pressure is measured in step 1410. If the valve condition is vented then a controlled leak (for example, a small, measurable leak) is identified in step 1412. If the valve condition is open then gas is drawn in step 1414. In step 1416, the flow sensor data is recorded and stored. In step 1418 it is determined whether each permutation created in step 104 has been tested, and if not, loop 1420 returns to step 1406 so as to set the condition for each valve for the next permutation in the permutations created in step 1404. If in step 1408 it is determined that each of the permutations has been tested then a leak fingerprint database is created or augmented in step 1422.

Vacuum line and flow sensor location optimization 1500 is illustrated in the flow chart of FIG. 29. Geometry and vacuum line and flow sensor data is gathered in step 1502. In step 1504 the fingerprint database is analyzed so as to examine the sensitivity of flow sensor and vacuum line locations. In step 1506 the vacuum lines and flow sensors are identified that can be removed with minimal impact on the effectiveness of the system. In step 1508, the regions are identified where the addition of vacuum lines and flow sensors may increase the effectiveness of the system.

Instead of pulling vacuum on all vacuum lines at the same time, the system may (automatically) turn individual vacuum lines on or off, thus each vacuum line may either draw gas out, or become a dead end, measuring the local vacuum level/pressure. By working through all combinations and permutations of vacuum lines being on or off, significant additional information may be generated about the location of the leak or off-gassing. This information may be used in any one, or a combination of, the methods described previously for localization/triangulation/fingerprinting.

Gas paths throughout a complex part may be characterized. Instead of having two options for each vacuum line (open vacuum pump or closed), each vacuum line may either be drawing vacuum, closed, or vented to the atmosphere (thus allowing air to come in). By then evaluating all combinations, the local gas permeability's of the assembly may be evaluated, and used to calibrate the localization/triangulation/fingerprinting methods previously described.

Currently, to applicant's knowledge the positioning of vacuum lines is based on experience and common sense, with no optimization. In a further aspect of the present invention the information gathered previously (by any of the methods, but in particular the analytical triangulation or computational fingerprinting) may be used to identify the sensitivity of the system to the number and positioning of the flow sensors. Optimization may be general, as in being sensitive to any leak or off-gassing event, or specific, responding to the leaks or off-gassing events that are more critical for a given part (for example ensuring that leaks are least likely to occur in a complex zone of a part where repair is difficult or impossible). By optimizing, the number of vacuum lines and sensors needed is minimized, and the sensitivity of the detection for a given number of lines and sensors is maximized. The optimization will be part shape and size dependent, including details of moulds or tooling, caul plates, inserts, and bagging.

In a further embodiment each gas conduit or gas port has a corresponding unique identifier so as to correlate the gas flow data with said corresponding unique identifier. The unique identifier may identify a unique location and may be chosen from the group which includes, for example, barcode, or radio-frequency identification.

In a further embodiment at least one gas conduit may be adapted to carry power and/or data.

In the above description of the system, including in the description of the software processing information needed by the system (for example the sensor data), as will be apparent to one skilled in the art, the meaningful and efficient way to determine the output from the system, for example the feedback described above, is by the use of a digital processor such as a computer. In particular in order to obtain feedback in real time, or in a useful time to enhance production efficiency and productivity, a digital processor is used to transform the sensor data for example into feedback that locates gas-based defects identified herein.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A process for locating a porosity-causing gas leak during manufacturing of a composite part, wherein during said manufacturing said part is engaged by a vacuum bag or mould so as to define a flexible non-compartmentalized single volume containing or covering the part and said single volume is evacuated to low pressure, and wherein the gas leak is due to a leak associated with the vacuum bag or mould such that atmospheric gas leaks into the single volume, and wherein a plurality of gas conduits cooperate in fluid communication with said vacuum bag or mould for flow of gas through said plurality of gas conduits, and wherein said vacuum bag and mould is mounted so as to engage the part, and wherein a plurality of sensors are coupled in cooperation with said plurality of gas conduits, and wherein said plurality of sensors are coupled in spaced apart array relative to said vacuum bag or mould, and wherein said plurality of sensors are in fluid communication with said single volume between the part and said vacuum bag or mould and wherein said plurality of sensors are adapted to detect and measure at least one of mass flow rate and/or pressure, the process comprising:
   a) evacuating said single volume
   b) detecting and measuring said at least one of mass flow rate and/or pressure at least during said evacuating of said volume,
   c) generating gas flow data corresponding to said detecting and measuring of said at least one of mass flow rate and/or pressure,
   d) computing gas leak information relating to one or more of the gas leaks into said volume from said gas flow data by methods chosen from the group consisting of:
      (i) localizing a leak into the volume using the gas flow data and using the geometry of the part and sensor location information of said plurality of sensors in said array in relation to the part to predict locations of one or more of the gas leaks into the volume by:
         (a) fitting a curve to the gas flow data for each sensor of said plurality of sensors in said array,
         (b) identifying a peak in each curve,
         (c) triangulating on the peaks,
         (d) predicting the leak location as corresponding to the triangulated location of the peaks,
      (ii) localizing one or more of the gas leaks into the volume using a profile of the gas flow data and historical records of past profiles of the gas flow data by:
         (a) recording a profile over time of the gas flow data for the part,
         (b) creating and maintaining a historical record of the profile over time of the gas flow data correlated to a physical specification of the part,
         (c) predicting a location of the one or more gas leaks into the single volume by:
            (1) comparing said recording with said historical record and locating a matching profile in said historical record matching for said part,
            (2) determining from said matching profile of said historical record the corresponding leak locations,
      (iii) localizing one or more of the gas leaks into the volume using a profile of the gas flow data and historical records of past profiles of the gas flow data by:
         (a) creating a grid of virtual gas leak locations employing the geometry of the part and locations of the plurality of sensors relative to the part, and for each of the locations calculating at least the profile of the gas flow rate for a predetermined flow rate of the gas leak to predict the gas leak information and,
         (b) comparing the predicted gas leak information to the historical records and determining a closest match and thereby a corresponding predicted gas leak location,
      (iv) localizing one or more of the gas leaks into the volume using a profile of the gas flow data and historical records of past profiles of the gas flow data by:
         (a) creating a grid of representative gas leak locations employing the geometry of the part and locations of the plurality of sensors relative to the part, and for each of the locations creating a resealable and measurable gas leak and recording corresponding gas flow data for each of the locations to provide the historical record of the defect information for the part, and
         (b) comparing the gas flow data to the historical record for the part to determine a closest match and thereby a corresponding predicted gas leak location, and
   wherein said process further includes optimizing a location of said at least one of said plurality of sensors on said gas conduits to account for the geometry of the part, and
   wherein said detecting and measuring said at least one of mass flow rate and/or pressure in said gas conduits, and subsequent corresponding said determination of said gas leak information, is detected and measured during when at least first of said gas conduits are biased into an open-to-gas flow condition and at least second of said gas conduits are biased into a closed-to-gas flow condition during said evacuation of said volume.

2. The process of claim 1 further comprising relaying to a user feedback of said gas leak information, wherein said relaying of said feedback includes displaying said gas leak information to the user while the user is inspecting said part and said vacuum bag or mould, and wherein said defect gas leak information includes predicted leak locations computed for said at least one gas leak.

3. The process of claim 1 wherein said plurality of sensors also includes at least one sensor from the group consisting of radial flow direction sensors, humidity sensors, spectroscopic sensors.

4. The process of claim 3 wherein said process includes mounting said at least one sensor to a corresponding said at least one gas conduit.

5. The process of claim 3 wherein said plurality of sensors includes at least one mass flow sensor, at least one pressure sensors and at least one differential pressure sensor.

6. The process of claim 3 further comprising providing a sensor package and wherein said sensor package includes at least two of said plurality of sensors within said package.

7. The process of claim 5 further comprising providing a sensor package and wherein said sensor package includes said mass flow sensors, said pressure sensors and said differential pressure sensors within said package.

8. The process of claim 4 wherein at least one of said plurality of sensors is mounted in said volume.

9. The process of claim 8 further comprising providing breather material in said volume between said part and said vacuum bag or mould, wherein said breather material has substantially uniform permeability.

10. The process of claim 4 further comprising providing a flow bypass having a resilient flexible bypass valve member and cooperating with at least one of said plurality of sensors to reduce a pressure drop across at least one of said sensors.

11. The process of claim 3 wherein said at least one of said plurality of sensors is coupled in cooperation with at least one of the group consisting of: said plurality of gas conduits, gas ports, a gas breather, a mat having sensor flow passages, a manifold, the vacuum bag or mould.

12. The process of claim 10 wherein said bypass valve member includes a reed means.

13. The process of claim 12 wherein said reed means is biased between open and closed positions, according to a pre-determined pressure threshold, by a gas pressure of said gas flow.

14. The process of claim 13 wherein said pressure threshold is a differential pressure threshold of a differential pressure across an associated sensor of said plurality of sensors.

15. The process of claim 13 wherein said bypass reed means is maintained in said closed position by a magnetic field.

16. The process of claim 1 wherein said biasing of said at least first and said at least second of said gas conduits into said open-to-gas flow and said closed-to-gas flow conditions respectively is cycled through all of said gas conduits in a pattern of opening and closing of said gas conduits to said gas flow, wherein said pattern provides said opening and closing in all permutations as between all combinations of said opening and closing of said gas conduits.

17. The process of claim 16 wherein said pattern is predetermined.

18. The process of claim 1 further comprising a flow bypass mounted in fluid communication with a corresponding gas conduit of said plurality of gas conduits said at least one conduit, and separate from, so as to not be mounted to said at least one sensor.

19. The process of claim 12 wherein said reed means includes a curved reed, and wherein said curved reed is curved so as to elastically pre-load said reed when in said closed position.

20. The process of claim 15 wherein said reed means includes a curved reed, and wherein said curved reed is curved so as to elastically pre-load said reed when in said closed position.

21. The process of claim 4 wherein said at least one sensor is adapted to measure said flow of gas both into and out of said volume.

22. The process of claim 3 wherein said plurality of gas conduits includes a corresponding at least one inlet and/or outlet filter.

23. The process of claim 1 wherein during said leak detection said gas is other than air.

24. The process of claim 1 further comprising providing a second vacuum system independent of said plurality of gas conduits for said evacuating process, said second vacuum system mounted in a second, independent, fluid communication with said vacuum bag or mould, and further comprising the step of using the second vacuum system to locally change a pressure in said vacuum bag or mould so as to change a flow rate of said flow of gas through said plurality of gas conduits for said evacuating process and so as to change said flow rate of said flow of gas interacting with said at least one of said plurality of sensors.

25. The process of claim 13 wherein said plurality of gas conduits has a corresponding unique identifier for each conduit in said at least one gas conduit so as to correlate said gas flow data with said corresponding unique identifier and wherein the unique identifier is chosen from the group which includes: barcodes, radio-frequency identification.

26. The process of claim 1 wherein said plurality of gas conduits are adapted to carry power and/or data.

27. The process of claim 1 wherein said sensors include spectroscopic sensors to provide spectroscopic data for spectrographic analysis chosen from the group consisting of: fourier transform infrared spectroscopy, near-infrared spectroscopy.

28. A process for locating a porosity-causing gas leak during manufacturing of a composite part, wherein during said manufacturing said part is engaged by a vacuum bag or mould so as to define a flexible non-compartmentalized single volume containing or covering the part and said single volume is evacuated to low pressure, and wherein the gas leak is due to a leak associated with the vacuum bag or mould such that atmospheric gas leaks into the single volume, and wherein a plurality of gas conduits cooperate in fluid communication with said vacuum bag or mould for flow of gas through said plurality of gas conduits, and wherein said vacuum bag and mould is mounted so as to engage the part, and wherein a plurality of sensors are coupled in cooperation with said plurality of gas conduits, and wherein said plurality of sensors are coupled in spaced apart array relative to said vacuum bag or mould, and wherein said plurality of sensors are in fluid communication with said single volume between the part and said vacuum bag or mould and wherein said plurality of sensors are adapted to detect and measure at least one of mass flow rate and/or pressure, the process comprising:
 a) evacuating said single volume
 b) detecting and measuring said at least one of mass flow rate and/or pressure at least during said evacuating of said volume,
 c) generating gas flow data corresponding to said detecting and measuring of said at least one of mass flow rate and/or pressure,
 d) computing gas leak information relating to one or more of the gas leaks into said volume from said gas flow data by methods chosen from the group consisting of:
  (i) localizing a leak into the volume using the gas flow data and using the geometry of the part and sensor location information of said plurality of sensors in said array in relation to the part to predict locations of one or more of the gas leaks into the volume by:
   (a) fitting a curve to the gas flow data for each sensor of said plurality of sensors in said array,
   (b) identifying a peak in each curve,
   (c) triangulating on the peaks,
   (d) predicting the leak location as corresponding to the triangulated location of the peaks,
  (ii) localizing one or more of the gas leaks into the volume using a profile of the gas flow data and historical records of past profiles of the gas flow data by:

(a) recording a profile over time of the gas flow data for the part, (b) creating and maintaining a historical record of the profile over time of the gas flow data correlated to a physical specification of the part, (c) predicting a location of the one or more gas leaks into the single volume by:
  (1) comparing said recording with said historical record and locating a matching profile in said historical record matching for said part,
  (2) determining from said matching profile of said historical record the corresponding leak locations, (iii) localizing one or more of the gas leaks into the volume using a profile of the gas flow data and historical records of past profiles of the gas flow data by:
  (a) creating a grid of virtual gas leak locations employing the geometry of the part and locations of the plurality of sensors relative to the part, and for each of the locations calculating at least the profile of the gas flow rate for a predetermined flow rate of the gas leak to predict the gas leak information and,
  (b) comparing the predicted gas leak information to the historical records and determining a closest match and thereby a corresponding predicted gas leak location, (iv) localizing one or more of the gas leaks into the volume using a profile of the gas flow data and historical records of past profiles of the gas flow data by:
  (a) creating a grid of representative gas leak locations employing the geometry of the part and locations of the plurality of sensors relative to the part, and for each of the locations creating a resealable and measureable gas leak and recording corresponding gas flow data for each of the locations to provide the historical record of the defect information for the part, and
  (b) comparing the gas flow data to the historical record for the part to determine a closest match and thereby a corresponding predicted gas leak location, and wherein said triangulating on the peaks includes determining combinations of pairs of sensors of said plurality of sensors by employing the geometry of said part and locations of said sensors relative to said part, and for each said pair of sensors determine corresponding triangle apexes for all triangles from each said pair of sensors wherein, for each said pair of sensors, a base leg of said triangle extends to and between said pair of sensors, and a remaining two legs of said triangle define an apex there-between at the intersection thereof, and wherein said remaining two legs have first and second lengths respectively in proportion to corresponding first and second said gas flow rates at said pair of sensors respectively so as to determine for each said pair of sensors a corresponding set of said triangle apexes to thereby provide a corresponding apex set for said pair of sensors, for each said apex set determine either:
  a) a point of intersection between said apex sets,
  b) where there is no said point of intersection, a mid-point of a line joining points closest to one another between all of said apexes to provide possible leak locations.

29. The process of claim 28 wherein the step (d)(i) further comprising computing the average of said multiple leak locations to thereby predict a single leak location.

* * * * *